US012511735B2

(12) United States Patent
Gurevich

(10) Patent No.: US 12,511,735 B2
(45) Date of Patent: Dec. 30, 2025

(54) METHODS AND SYSTEMS FOR CHARACTERIZING TISSUE OF A SUBJECT

(71) Applicant: Stryker Corporation, Kalamazoo, MI (US)

(72) Inventor: Lina Gurevich, Vancouver (CA)

(73) Assignee: Stryker Corporation, Portage, MI (US)

( * ) Notice: Subject to any disclaimer, the term of this patent is extended or adjusted under 35 U.S.C. 154(b) by 773 days.

(21) Appl. No.: 17/812,438

(22) Filed: Jul. 13, 2022

(65) Prior Publication Data

US 2023/0036068 A1  Feb. 2, 2023

Related U.S. Application Data

(60) Provisional application No. 63/221,877, filed on Jul. 14, 2021.

(51) Int. Cl.
*G06T 7/00* (2017.01)
*A61B 5/00* (2006.01)
*G16H 50/20* (2018.01)

(52) U.S. Cl.
CPC .......... *G06T 7/0012* (2013.01); *A61B 5/7267* (2013.01); *A61B 5/7275* (2013.01);
(Continued)

(58) Field of Classification Search
CPC ......... G06T 7/0012; G06T 2207/10064; G06T 2207/20081; G06T 2207/30024;
(Continued)

(56) References Cited

U.S. PATENT DOCUMENTS 11,526,703 B2 * 12/2022 Moore .................. G06V 10/58
2016/0324420 A1 * 11/2016 Zhu ........................ A61B 6/00
2019/0164287 A1 * 5/2019 Gregson ................ G16H 30/40

FOREIGN PATENT DOCUMENTS

CN          113261939 B  *  2/2025   ......... A61B 5/02007

OTHER PUBLICATIONS

Schlegl, Thomas, et al. "f-AnoGAN: Fast unsupervised anomaly detection with generative adversarial networks." Medical image analysis 54 (2019): 30-44. (Year: 2019).*

(Continued)

*Primary Examiner* — Neil R Mclean
(74) *Attorney, Agent, or Firm* — Morrison & Foerster LLP

(57) ABSTRACT

The present disclosure relates generally to medical imaging, and more specifically to machine-learning techniques to analyze and generate medical images to characterize tissue of a subject (e.g., to aid diagnosis and/or treatment of diseases). An exemplary method of displaying risk assessment of a tissue of a subject comprises: receiving a fluorescence image of the tissue of the subject; providing the fluorescence image to a trained generative adversarial ("GAN") model, wherein the GAN model is trained using a plurality of unlabeled training images associated with a normal future outcome; obtaining, based on the GAN model, one or more pixel-wise anomaly scores associated with one or more pixels of the fluorescence image, wherein the one or more pixel-wise anomaly scores are indicative of abnormality of the tissue of the subject; and displaying, based on the one or more pixel-wise anomaly scores, the risk assessment of the tissue in the fluorescence image.

34 Claims, 20 Drawing Sheets
(1 of 20 Drawing Sheet(s) Filed in Color)

(52) U.S. Cl.
CPC ... *G16H 50/20* (2018.01); *G06T 2207/10064* (2013.01); *G06T 2207/20081* (2013.01); *G06T 2207/30024* (2013.01)

(58) Field of Classification Search
CPC .... A61B 5/7267; A61B 5/7275; G16H 50/20; G16H 40/63; G16H 50/30; G16H 30/40
USPC ......................................................... 382/128
See application file for complete search history.

(56) References Cited

OTHER PUBLICATIONS

Azizi et al. (Apr. 2021) "Big Self-Supervised Models Advance Medical Image Classification," located at https://doi.org/10.48550/arXiv.2101.05224, (19 pages).
Davletshina et al. (Nov. 2020) "Unsupervised Anomaly Detection for X-Ray Images," located at https://doi.org/10.48550/arXiv.2001.10883, (22 pages).
Goyal et al. (Mar. 2021) "SEER: The start of a more powerful, flexible, and accessible era for computer vision," located at https://ai.meta.com/blog/seer-the-start-of-a-more-powerful-flexible-and-accessible-era-for-computer-vision/, (8 pages).
International Preliminary Report on Patentability mailed Jan. 25, 2024, directed to International Application No. PCT/US2022/073701; 13 pages.
International Search Report and Written Opinion mailed Dec. 19, 2022, directed to International Application No. PCT/US2022/073701; 18 pages.
Invitation to Pay Additional Fees mailed Oct. 26, 2022, directed to International Application No. PCT/US2022/073701; 16 pages.
Isola et al. (Nov. 2018) "Image-to-Image Translation with Conditional Adversarial Networks," located at https://doi.org/10.48550/arXiv.1611.07004, (17 pages).
Jaiswal et al. (Dec. 2020) "A Survey on Contrastive Self-supervised Learning," located at https://doi.org/10.48550/arXiv.2011.00362, (20 pages).
Karras et al. (Jun. 2020) "Training Generative Adversarial Networks with Limited Data," located at https://doi.org/10.48550/arXiv.2006.06676, (32 pages).
Karras et al. (Mar. 2020) "Analyzing and Improving the Image Quality of StyleGAN," located at https://doi.org/10.48550/arXiv.1912.04958, (21 pages).
Kuang et al. (Apr. 2020) "Unsupervised Multi-Discriminator Generative Adversarial Network for Lung Nodule Malignancy Classification," located at https://ieeexplore.ieee.org/document/9066829, (10 pages).
Lang et al. (2021) "Explaining in Style: Training a GAN to explain a classifier in StyleSpace," located at https://explaining-in-style.github.io/, (10 pages).
Lang et al. (Jan. 2022) "Introducing StylEx: A New Approach for Visual Explanation of Classifiers," located at https://research.google/blog/introducing-stylex-a-new-approach-for-visual-explanation-of-classifiers/, (12 pages).
Park et al. (Jul. 2020) "Contrastive Learning for Unpaired Image-to-Image Translation," located at https://doi.org/10.48550/arXiv.2007.15651, (28 pages).
Schlegl et al. (2019) "Code for reproducing f-AnoGAN training and anomaly scoring," located at https://github.com/tSchlegl/f-AnoGAN, (3 pages).
Schlegl et al. (Mar. 2017) "Unsupervised Anomaly Detection with Generative Adversarial Networks to Guide Marker Discovery," located at https://doi.org/10.48550/arXiv.1703.05921, (12 pages).
Selvaraju et al. (Dec. 2019) "Grad-CAM: Visual Explanations from Deep Networks via Gradient-based Localization," located at https://doi.org/10.48550/arXiv.1610.02391, (23 pages).
Singh et al. (May 2020) "Explainable deep learning models in medical image analysis," located at https://doi.org/10.48550/arXiv.2005.13799, (18 pages).
Tang et al. (Aug. 2019) "Attention-Guided Generative Adversarial Networks for Unsupervised Image-to-Image Translation," located at https://doi.org/10.48550/arXiv.1903.12296, (8 pages).
Van Den Hoven et al. (Oct. 2021) "Perfusion Patterns in Patients with Chronic Limb-Threatening Ischemia versus Control Patients Using Near-Infrared Fluorescence Imaging with Indocyanine Green," located at https://doi.org/10.3390/biomedicines9101417, (9 pages).
Wu et al. (Dec. 2020) "StyleSpace Analysis: Disentangled Controls for StyleGAN Image Generation," located at https://doi.org/10.48550/arXiv.2011.12799, (25 pages).
Yi et al. (Sep. 2018) "Generative Adversarial Network in Medical Imaging: A Review," located at arXiv:1809.07294v3, (20 pages).
Zhou et al. (Feb. 2020) "Sparse-GAN: Sparsity-constrained Generative Adversarial Network for Anomaly Detection in Retinal OCT Image," located at https://doi.org/10.48550/arXiv.1911.12527, (5 pages).
Zhu et al. (Aug. 2020) "Unpaired Image-to-Image Translation using Cycle-Consistent Adversarial Networks," located at https://doi.org/10.48550/arXiv.1703.10593, (18 pages).

* cited by examiner

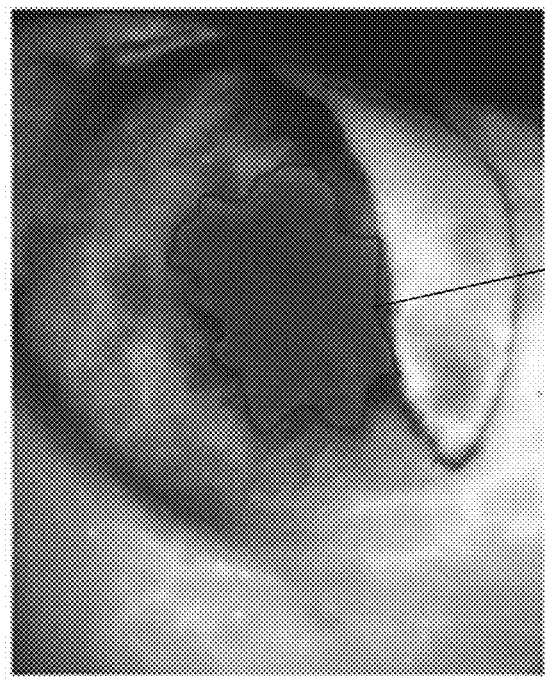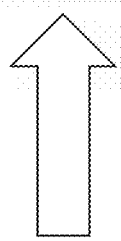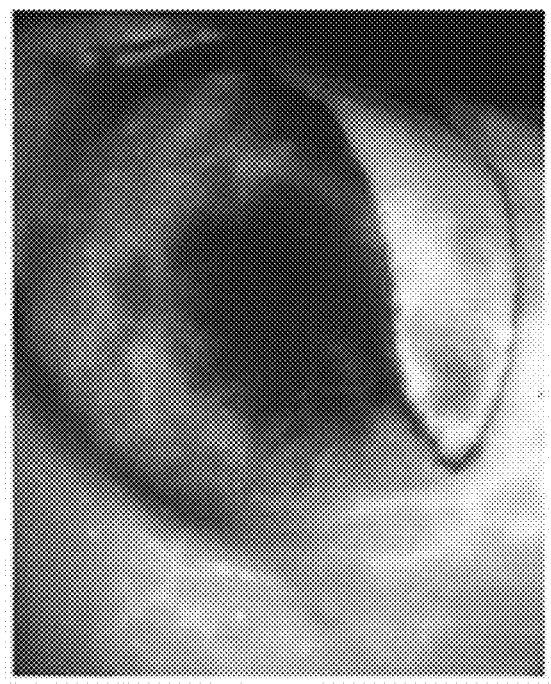
FIG. 6

700

702
Collecting a plurality of training images and a plurality of testing images, wherein the plurality of training images comprises a plurality of unlabeled images associated with a normal future outcome, and wherein the plurality of testing images comprises a plurality of images associated with an adverse future outcome

704
Training the GAN model using the plurality of training images

706
Testing the GAN model using the plurality of testing images

FIG. 7

METHODS AND SYSTEMS FOR CHARACTERIZING TISSUE OF A SUBJECT

CROSS-REFERENCE TO RELATED APPLICATIONS

This application claims the benefit of U.S. Provisional Application 63/221,877, filed Jul. 14, 2021, the entire contents of which are hereby incorporated by reference herein.

FIELD

The present disclosure relates generally to medical imaging, and more specifically to machine-learning techniques to analyze and generate medical images to characterize tissue of a subject (e.g., to aid diagnosis and/or treatment of diseases).

BACKGROUND

Given a medical image of a tissue of a subject, it is valuable to characterize the tissue. For example, it is valuable to visually mark in the image the tissue areas that are indicative of a higher risk of developing complications. For example, in plastic or reconstructive surgeries, it is useful to image the operated breast and mark in the image those areas of the operated breast that are more likely to become necrotic. As another example, in colorectal surgeries, it is useful to mark in an image those areas of the colon showing perfusion patterns that are likely to result in anastomotic leak (e.g., due to imperfect stitching that may lead to complications). A medical image with markups showing high-risk tissue areas is referred to as a "tissue risk map."

Further, given a medical image of a tissue of a subject, it is valuable to generate a synthetic image that depicts a predicted future state of the tissue. For example, given a medical image of an operated breast during a surgery, it would be useful to generate a synthetic image depicting what the breast would look like 2 weeks after the surgery.

Further, when analyzing a medical image of a tissue of a subject, it is valuable to account for the diverse nature of the normal data distribution. There are numerous patient-specific characteristics that can contribute to dissimilarities among normal data samples in medical images. Furthermore, noisy data capture settings and/or dynamic changes in monitoring environments can lead normal samples to appear as out-of-distribution samples (i.e. abnormal samples). Failing to account for the diverse nature of the normal data distribution can yield higher false positive rates.

While conventional supervised machine-learning algorithms may be used to perform or address some of the above-described tasks, supervised machine-learning algorithms can be impractical to implement due to scarcity of training data. To train a supervised machine-learning model, a large amount of training data needs to be collected and manually labelled. This process can be cumbersome and expensive, and mis-labelling and human errors may also be introduced. Moreover, many clinical settings have a fairly low rate of complications (e.g., approximately 1-5%), which presents a unique challenge in collecting a large enough data sample corresponding to abnormal outcomes.

Thus, it is desirable to develop machine-learning algorithms for processing medical images that do not require a large volume of labelled training data or a large volume of abnormal data.

SUMMARY

Disclosed herein are exemplary devices, apparatuses, systems, methods, and non-transitory storage media for training a generative adversarial ("GAN") model to generate a tissue risk map to display risk assessment of a tissue of a subject. The GAN model can be trained using unlabeled images associated with a normal future outcome. For example, the GAN model can be trained using unlabeled images of surgical procedures where the patients are known to have recovered timely after the surgical procedures. The trained GAN model can be tested with a combination of labeled normal images and labeled abnormal images. As discussed below, anomaly detection using a GAN model is the task of modeling normal images using the adversarial training process and detecting anomalies in an input image by measuring an anomaly score (i.e., deviation from a normal sample).

In some examples, significantly more unlabeled training images (e.g., >3,000 videos) are used to train the GAN model than the labeled testing images used to test the GAN model. Further, only a subset of the labeled test images are abnormal images (e.g., 10-100 videos). These techniques are advantageous because labeling a large volume of training data can be impractical, error-prone, and expensive. These techniques further bypass the problem of a highly unbalanced dataset, as many medical operations and procedures have a fairly low rate of complications, thus causing the abnormal images to be relatively scarce.

Collecting, labeling, and storing a large volume of training images can lead to inefficient usage of computer memory and processing power. By using unlabeled normal images to train the GAN model, the techniques can lead to better usage and management of computer memory and more efficient usage of compute processing power, thus improving functioning of a computer system. Further, the various machine-learning models described herein can result in more accurate diagnosis and/or treatment of diseases, as discussed herein.

In some examples, the techniques can be applied to any image modality where blood perfusion dynamics is correlated with the outcome and/or diagnostic and where the case distribution is skewed towards normal observations. For example, the system can train the model on fluorescence images acquired from healthy patients (or from healthy tissues of sick patients) and then use the trained model for identification of malignancies (e.g., cancerous vs. benign lesions).

Also disclosed herein are exemplary devices, apparatuses, systems, methods, and non-transitory storage media for generating, based on fluorescence images of a tissue (e.g., captured during a surgery), simulated white-light image that represents a predicted future state of the tissue (e.g., 1-3 weeks after the surgery). In some examples, a GAN model can be trained using unpaired data. In other words, the training dataset does not need to contain a fluorescence image and a white-light image of the same subject. Eliminating the need for paired images is advantageous because paired images can be difficult or even impractical to obtain.

In some examples, the GAN model can be trained using two datasets of images: the perfusion videos and the white-light outcome photos. The images in the two datasets can come from different patients and may not have one-to-one correlations. By using unpaired images to train the GAN model, the techniques can lead to better usage and management of computer memory and more efficient usage of compute processing power, thus improving functioning of a computer system. Further, the GAN model can result in more accurate diagnosis and/or treatment of diseases, as discussed herein.

Also described herein are exemplary devices, apparatuses, systems, methods, and non-transitory storage media for using a combination of self-supervised learning and supervised learning techniques to process medical images including fluorescence images. In some examples, a self-supervised encoder is trained using unlabeled images. For example, the unlabeled training images can include image frames from intraoperative videos (e.g., videos of surgical procedures). Different image frames can be sampled from different time points in a video, and they are not labelled with any additional information such as patient's metadata and outcomes. The encoder is trained to receive an input image and transform the input image into a latent representation, which amplifies the general features of the image while minimizing image-specific characteristics. After the encoder is trained, a model that is configured to receive the latent representation to perform a downstream task (e.g., a classification task) can be fine-tuned using training images that are labelled in accordance with the downstream task. The labeled training dataset can include fewer images than the unlabeled training dataset, thus reducing the need to label a large number of medical images.

Collecting, labeling, and storing a large volume of training images can lead to inefficient usage of computer memory and processing power. By training the encoder using unlabeled training data, the techniques can lead to better usage and management of computer memory and more efficient usage of compute processing power, thus improving functioning of a computer system. Further, the various machine-learning models described herein can result in more accurate diagnosis and/or treatment of diseases, as discussed herein.

An exemplary method of displaying risk assessment of a tissue of a subject comprises: receiving a fluorescence image of the tissue of the subject; providing the fluorescence image to a trained generative adversarial ("GAN") model, wherein the GAN model is trained using a plurality of unlabeled training images associated with a normal future outcome; obtaining, based on the GAN model, one or more pixel-wise anomaly scores associated with one or more pixels of the fluorescence image, wherein the one or more pixel-wise anomaly scores are indicative of abnormality of the tissue of the subject; and displaying, based on the one or more pixel-wise anomaly scores, the risk assessment of the tissue in the fluorescence image.

In some examples, the risk assessment comprises a color overlay on the fluorescence image.

In some examples, the method further comprises comparing each of the one or more pixel-wise anomaly scores with a pixel-wise threshold; and determining pixel-wise color intensities of the color overlay based on the comparison.

In some examples, the method further comprises calculating an image-wise anomaly score based on the one or more pixel-wise anomaly scores.

In some examples, the method further comprises predicting a future medical outcome of the tissue of the subject based on the image-wise anomaly score by comparing the image-wise anomaly score with a predefined image-wise threshold.

In some examples, the method further comprises providing a recommendation based on the predicted future outcome of the tissue of the subject.

In some examples, the recommendation is for administering a treatment based on the predicted future outcome of the tissue of the subject.

In some examples, the fluorescence image is a NIR image of the tissue of the subject.

In some examples, the fluorescence image is an intraoperative perfusion image of the tissue of the subject.

In some examples, the fluorescence image is from an intraoperative perfusion video of the tissue of the subject.

In some examples, the plurality of unlabeled training images comprises a plurality of intraoperative images of one or more tissues of one or more patients, wherein the one or more tissues are known to have had a timely post-operation recovery.

In some examples, the GAN is tested using a plurality of testing images associated with an adverse future outcome, wherein the plurality of testing images comprises a plurality of intraoperative images of one or more tissues of one or more patients, and wherein the one or more tissues are known to have developed one or more post-operation complications.

In some examples, the one or more post-operation complications include: necrosis, anastomotic leak, delayed healing, mortality, or any combination thereof.

In some examples, the GAN model comprises: a trained generator, a trained discriminator, and a trained encoder.

In some examples, the generator is configured to receive a latent vector and generate an output image.

In some examples, the discriminator is configured to measure a distance between two images.

In some examples, the encoder is configured to receive an input image and output a latent vector.

In some examples, the GAN model is trained by: training the generator and the discriminator; and training the encoder using the trained generator and the trained discriminator.

In some examples, training the encoder comprises: providing a training image of the plurality of unlabeled training images to the encoder to obtain a latent vector; providing the latent vector to the trained generator to obtain a generated image; calculating a first loss based on a difference between the generated image and the training image; providing the generated image and the real image to the trained discriminator to obtain a second loss; and updating the encoder based on the first loss and the second loss.

In some examples, providing the fluorescence image to the trained GAN model comprises: providing the fluorescence image to the trained encoder to obtain a latent vector; providing the latent vector to the trained generator to obtain a generated image; calculating a first difference between the fluorescence image and the generated image; providing the generated image and the fluorescence image to the trained discriminator to obtain a second difference; and calculating the anomaly score based on the first difference and the second difference.

In some examples, the GAN model is an f-AnoGAN model.

In some examples, the GAN model comprises: a trained generator, a trained discriminator, and a trained encoder identical to a portion of the trained generator.

In some examples, the generator is configured to receive an input image, translate the input image into a latent vector, and translate the latent vector into an output image.

In some examples, the discriminator is configured to measure a distance between two images.

In some examples, the GAN model is trained by: providing a training image of the plurality of unlabeled training images to the generator to obtain a latent vector and a generated image; calculating a first loss based on the training image and the generated image; providing the generated image and the training image to the discriminator to obtain a second loss; and updating the model based on the first loss and the second loss.

In some examples, providing the fluorescence image to the trained GAN model comprises: providing the fluorescence image into the trained generator to obtain a first latent vector and a generated image; providing the generated image to the trained encoder to obtain a second latent vector; and calculating the anomaly score based on the first latent vector and the second latent vector.

In some examples, the GAN model is a Sparse-GAN model.

In some examples, the GAN model is tested using a plurality of testing images associated with an adverse future outcome and a plurality of testing images associated with a normal future outcome.

In some examples, testing the GAN model comprises: inputting the plurality of testing image to the trained GAN model to obtain a plurality of anomaly scores; and calculating a predefined image-wise threshold based on the plurality of anomaly scores.

In some examples, testing the GAN model comprises: inputting the plurality of testing image to the trained GAN model to obtain a plurality of pixel-wise anomaly scores; and calculating a predefined pixel-wise threshold based on the plurality of pixel-wise anomaly scores.

In some examples, the GAN model is a StyleGAN model.

In some examples, the method of displaying risk assessment of a tissue of a subject further comprises: obtaining, based on the GAN model, a classification of the tissue in the fluorescence image, wherein the classification includes an indication of a probability of necrosis; searching a StyleSpace of a generator of the GAN model for a set of one or more top-K attributes that affect classification of the fluorescence image; and displaying the set of one or more top-K attributes on an interactive user interface.

In some examples, the interactive user interface comprises a control panel configured to manipulate the set of one or more top-K attributes and visualize an effect of each top-K attribute on the classification of the fluorescence image.

In some examples, the fluorescence image is a composite RGB image, wherein the composite RGB image comprises a first grayscale image taken during an ingress phase of an angiographic curve representing a first of the red, green and blue channels, a second grayscale image taken at a maximum intensity of the curve representing a second of the red, green and blue channels, and a third grayscale image taken during an egress phase of the curve representing a third of the red, green and blue channels.

In some examples, the fluorescence image is a composite RGB image, wherein the composite RGB image comprises a first grayscale image taken during an ingress phase of an angiographic curve representing a red channel, a second grayscale image taken at a maximum intensity of the curve representing a green channel, and a third gray scale image taken during an egress phase of the curve representing a blue channel.

An exemplary method of displaying a predicted future state of a tissue of a subject, comprises: receiving a fluorescence image of the tissue of the subject; providing the fluorescence image to a generator of a trained generative adversarial ("GAN") model; obtaining, from the generator, a simulated white-light image depicting the predicted future state of the tissue of the subject; and displaying, on the display, the simulated white-light image depicting the predicted future state of the tissue of the subject.

In some examples, the future state of the tissue include necrosis, delayed healing, healing, or any combination thereof.

In some examples, the method further comprises providing a recommendation based on the predicted future state of the tissue of the subject.

In some examples, the recommendation is for administering a treatment based on the predicted future outcome of the tissue of the subject.

In some examples, the method further comprises: providing the white-light image to a classification model to identify one or more complications.

In some examples, the one or more complications include: necrosis, delayed healing, or any combination thereof.

In some examples, the fluorescence image is a NIR image of the tissue of the subject.

In some examples, the fluorescence image is an intraoperative perfusion image of the tissue of the subject.

In some examples, the fluorescence image is from an intraoperative perfusion video of the tissue of the subject.

In some examples, the tissue of the subject comprises: breast tissue, burnt tissue, chronic wound tissue, acute wound tissue, or skin transplants.

In some examples, the GAN model is trained using a plurality of image pairs.

In some examples, each image pair of the plurality of image pairs comprises a fluorescence image of a particular tissue during an operation and a white-light image of the particular tissue after the operation.

In some examples, the GAN model is a pix2pix GAN model.

In some examples, the GAN is trained using unpaired image data.

In some examples, the unpaired image data comprises a set of intraoperative fluorescence images and post-operation white-light images.

In some examples, the unpaired image data is collected from a plurality of patients.

In some examples, the GAN is a CycleGAN model.

An exemplary method of providing a medical recommendation based on a fluorescence image of a tissue of a subject comprises: providing the fluorescence image to a trained encoder to obtain a latent representation of the fluorescence image, wherein the encoder is trained at least using a plurality of unlabeled fluorescence images sampled from an intraoperative perfusion video; providing the latent representation of the fluorescence image to a trained model; receiving, from the trained model, an output associated with the fluorescence image; and providing the medical recommendation based on the output associated with the fluorescence image.

In some examples, the output is a diagnosis of a disease. Alternatively, the output can be non-diagnostic.

In some examples, the output is a detection of a malignant tissue.

In some examples, the output is a predicted future outcome.

In some examples, the recommendation is for administering a treatment.

In some examples, the method further comprises identifying one or more regions of interest in the fluorescence image; and displaying the fluorescence image and an indication of the one or more regions of interest.

In some examples, the fluorescence image is a NIR image of the tissue of the subject.

In some examples, the fluorescence image is an intraoperative perfusion image of the tissue of the subject.

In some examples, the fluorescence image is from an intraoperative perfusion video of the tissue of the subject taken during a surgical procedure.

In some examples, the encoder is trained using a plurality of unlabeled non-medical images before being trained using the plurality of unlabeled fluorescence images.

In some examples, the encoder is trained by: obtaining a non-medical image of the plurality of unlabeled non-medical images; generating, based on the training image, two augmented images; providing each of the two augmented images to the encoder to obtain two latent representations; calculating a loss based on the two latent representations; and updating the encoder based on the loss to maximize a similarity between the two latent representations.

In some examples, the plurality of fluorescence images are sampled by: identifying, in the intraoperative perfusion video, an image having the highest frame intensity standard deviation; and identifying one or more additional images based on the identified image.

In some examples, the one or more additional images include an image captured before the image having the highest frame intensity standard deviation and an image captured after the image having the highest frame intensity standard deviation.

In some examples, the plurality of fluorescence images are sampled by: identifying a first image before an event in the intraoperative perfusion video; and identifying a second image after the event in the intraoperative perfusion video. The event can be non-invasive.

In some examples, the event is an injection.

In some examples, the encoder is trained by: providing two of the plurality of fluorescence images to the encoder to obtain two latent representations; calculating a loss based on the two latent representations; and updating the encoder based on the loss to maximize a similarity between the two latent representations.

In some examples, the model is trained using a plurality of labeled images.

In some examples, each image of the plurality of labeled images comprises: a label indicative of a diagnosis or a future outcome.

In some examples, the plurality of labeled images comprises one or more images from the intraoperative perfusion video.

In some examples, the one or more images are sampled by: identifying, in the intraoperative perfusion video, an image having the highest frame intensity standard deviation; and identifying one or more additional images based on the identified image.

In some examples, the one or more additional images include an image captured before the image having the highest frame intensity standard deviation and an image captured after the image having the highest frame intensity standard deviation.

In some examples, the trained model is a trained classification model.

An exemplary system for displaying risk assessment of a tissue of a subject comprises: one or more processors; one or more memories; and one or more programs, wherein the one or more programs are stored in the one or more memories and configured to be executed by the one or more processors, the one or more programs including instructions for receiving a fluorescence image of the tissue of the subject; providing the fluorescence image to a trained generative adversarial ("GAN") model, wherein the GAN model is trained using a plurality of unlabeled training images associated with a normal future outcome; obtaining, based on the GAN model, one or more pixel-wise anomaly scores associated with one or more pixels of the fluorescence image, wherein the one or more pixel-wise anomaly scores are indicative of abnormality of the tissue of the subject; and displaying, based on the one or more pixel-wise anomaly scores, the risk assessment of the tissue in the fluorescence image.

In some examples, the risk assessment comprises a color overlay on the fluorescence image.

In some examples, the one or more programs further include instructions for: comparing each of the one or more pixel-wise anomaly scores with a pixel-wise threshold; and determining pixel-wise color intensities of the color overlay based on the comparison.

In some examples, the one or more programs further include instructions for: calculating an image-wise anomaly score based on the one or more pixel-wise anomaly scores.

In some examples, the one or more programs further include instructions for: predicting a future medical outcome of the tissue of the subject based on the image-wise anomaly score by comparing the image-wise anomaly score with a predefined image-wise threshold.

In some examples, the one or more programs further include instructions for: providing a recommendation based on the predicted future outcome of the tissue of the subject.

In some examples, the recommendation is for administering a treatment based on the predicted future outcome of the tissue of the subject.

In some examples, the fluorescence image is a NIR image of the tissue of the subject.

In some examples, the fluorescence image is an intraoperative perfusion image of the tissue of the subject.

In some examples, the fluorescence image is from an intraoperative perfusion video of the tissue of the subject.

In some examples, the plurality of unlabeled training images comprises a plurality of intraoperative images of one or more tissues of one or more patients, wherein the one or more tissues are known to have had a timely post-operation recovery.

In some examples, the GAN is tested using a plurality of testing images associated with an adverse future outcome, wherein the plurality of testing images comprises a plurality of intraoperative images of one or more tissues of one or more patients, and wherein the one or more tissues are known to have developed one or more post-operation complications.

In some examples, the one or more post-operation complications include: necrosis, anastomotic leak, delayed healing, mortality, or any combination thereof.

In some examples, the GAN model comprises: a trained generator, a trained discriminator, and a trained encoder.

In some examples, the generator is configured to receive a latent vector and generate an output image.

In some examples, the discriminator is configured to measure a distance between two images.

In some examples, the encoder is configured to receive an input image and output a latent vector.

In some examples, the GAN model is trained by: training the generator and the discriminator; and training the encoder using the trained generator and the trained discriminator.

In some examples, training the encoder comprises: providing a training image of the plurality of unlabeled training images to the encoder to obtain a latent vector; providing the latent vector to the trained generator to obtain a generated image; calculating a first loss based on a difference between the generated image and the training image; providing the generated image and the real image to the trained discriminator to obtain a second loss; and updating the encoder based on the first loss and the second loss.

In some examples, providing the fluorescence image to the trained GAN model comprises: providing the fluorescence image to the trained encoder to obtain a latent vector; providing the latent vector to the trained generator to obtain a generated image; calculating a first difference between the fluorescence image and the generated image; providing the generated image and the fluorescence image to the trained discriminator to obtain a second difference; and calculating the anomaly score based on the first difference and the second difference.

In some examples, the GAN model is an f-AnoGAN model.

In some examples, the GAN model comprises: a trained generator, a trained discriminator, and a trained encoder identical to a portion of the trained generator.

In some examples, the generator is configured to receive an input image, translate the input image into a latent vector, and translate the latent vector into an output image.

In some examples, the discriminator is configured to measure a distance between two images.

In some examples, the GAN model is trained by: providing a training image of the plurality of unlabeled training images to the generator to obtain a latent vector and a generated image; calculating a first loss based on the training image and the generated image; providing the generated image and the training image to the discriminator to obtain a second loss; and updating the model based on the first loss and the second loss.

In some examples, providing the fluorescence image to the trained GAN model comprises: providing the fluorescence image into the trained generator to obtain a first latent vector and a generated image; providing the generated image to the trained encoder to obtain a second latent vector; and calculating the anomaly score based on the first latent vector and the second latent vector.

In some examples, the GAN model is a Sparse-GAN model.

In some examples, the GAN model is tested using a plurality of testing images associated with an adverse future outcome and a plurality of testing images associated with a normal future outcome.

In some examples, testing the GAN model comprises: inputting the plurality of testing image to the trained GAN model to obtain a plurality of anomaly scores; and calculating a predefined image-wise threshold based on the plurality of anomaly scores.

In some examples, testing the GAN model comprises: inputting the plurality of testing image to the trained GAN model to obtain a plurality of pixel-wise anomaly scores; and calculating a predefined pixel-wise threshold based on the plurality of pixel-wise anomaly scores.

An exemplary system for displaying a predicted future state of a tissue of a subject comprises: one or more processors; one or more memories; and one or more programs, wherein the one or more programs are stored in the one or more memories and configured to be executed by the one or more processors, the one or more programs including instructions for: receiving a fluorescence image of the tissue of the subject; providing the fluorescence image to a generator of a trained generative adversarial ("GAN") model; obtaining, from the generator, a simulated white-light image depicting the predicted future state of the tissue of the subject; and displaying, on the display, the simulated white-light image depicting the predicted future state of the tissue of the subject.

In some examples, the future state of the tissue include necrosis, delayed healing, healing, or any combination thereof.

In some examples, the one or more programs further include instructions for: providing a recommendation based on the predicted future state of the tissue of the subject.

In some examples, the recommendation is for administering a treatment based on the predicted future outcome of the tissue of the subject.

In some examples, the one or more programs further include instructions for: providing the white-light image to a classification model to identify one or more complications.

In some examples, the one or more complications include: necrosis, delayed healing, or any combination thereof.

In some examples, the fluorescence image is a NIR image of the tissue of the subject.

In some examples, the fluorescence image is an intraoperative perfusion image of the tissue of the subject.

In some examples, the fluorescence image is from an intraoperative perfusion video of the tissue of the subject.

In some examples, the tissue of the subject comprises: breast tissue, burnt tissue, chronic wound tissue, acute wound tissue, or skin transplants.

In some examples, the GAN model is trained using a plurality of image pairs.

In some examples, each image pair of the plurality of image pairs comprises a fluorescence image of a particular tissue during an operation and a white-light image of the particular tissue after the operation.

In some examples, the GAN model is a pix2pix GAN model.

In some examples, the GAN is trained using unpaired image data.

In some examples, the unpaired image data comprises a set of intraoperative fluorescence images and post-operation white-light images.

In some examples, the unpaired image data is collected from a plurality of patients.

In some examples, the GAN is a CycleGAN model.

An exemplary system for providing a medical recommendation based on a fluorescence image of a tissue of a subject comprises: one or more processors; one or more memories; and one or more programs, wherein the one or more programs are stored in the one or more memories and configured to be executed by the one or more processors, the one or more programs including instructions for: providing the fluorescence image to a trained encoder to obtain a latent representation of the fluorescence image, wherein the encoder is trained at least using a plurality of unlabeled fluorescence images sampled from an intraoperative perfusion video; providing the latent representation of the fluorescence image to a trained model; receiving, from the trained model, an output associated with the fluorescence image; and providing the medical recommendation based on the output associated with the fluorescence image.

In some examples, the output is a diagnosis of a disease. Alternatively, the output is non-diagnostic.

In some examples, the output is a detection of a malignant tissue.

In some examples, the output is a predicted future outcome.

In some examples, the recommendation is for administering a treatment.

In some examples, the one or more programs further include instructions for: identifying one or more regions of interest in the fluorescence image; and displaying the fluorescence image and an indication of the one or more regions of interest.

In some examples, the fluorescence image is a NIR image of the tissue of the subject.

In some examples, the fluorescence image is an intraoperative perfusion image of the tissue of the subject.

In some examples, the fluorescence image is from an intraoperative perfusion video of the tissue of the subject taken during a surgical procedure.

In some examples, the encoder is trained using a plurality of unlabeled non-medical images before being trained using the plurality of unlabeled fluorescence images.

In some examples, the encoder is trained by: obtaining a non-medical image of the plurality of unlabeled non-medical images; generating, based on the training image, two augmented images; providing each of the two augmented images to the encoder to obtain two latent representations; calculating a loss based on the two latent representations; and updating the encoder based on the loss to maximize a similarity between the two latent representations.

In some examples, the plurality of fluorescence images are sampled by: identifying, in the intraoperative perfusion video, an image having the highest frame intensity standard deviation; and identifying one or more additional images based on the identified image.

In some examples, the one or more additional images include an image captured before the image having the highest frame intensity standard deviation and an image captured after the image having the highest frame intensity standard deviation.

In some examples, the plurality of fluorescence images are sampled by: identifying a first image before an event in the intraoperative perfusion video; and identifying a second image after the event in the intraoperative perfusion video.

In some examples, the event is an injection.

In some examples, the encoder is trained by: providing two of the plurality of fluorescence images to the encoder to obtain two latent representations; calculating a loss based on the two latent representations; and updating the encoder based on the loss to maximize a similarity between the two latent representations.

In some examples, the model is trained using a plurality of labeled images.

In some examples, each image of the plurality of labeled images comprises: a label indicative of a diagnosis or a future outcome.

In some examples, the plurality of labeled images comprises one or more images from the intraoperative perfusion video.

In some examples, the one or more images are sampled by: identifying, in the intraoperative perfusion video, an image having the highest frame intensity standard deviation; and identifying one or more additional images based on the identified image.

In some examples, the one or more additional images include an image captured before the image having the highest frame intensity standard deviation and an image captured after the image having the highest frame intensity standard deviation.

In some examples, the trained model is a trained classification model.

An exemplary non-transitory computer-readable storage medium stores one or more programs, the one or more programs comprising instructions, which when executed by one or more processors of an electronic device, cause the electronic device to perform any of methods described herein.

BRIEF DESCRIPTION OF THE FIGURES

The patent or application file contains at least one drawing executed in color. Copies of this patent or patent application publication with color drawing(s) will be provided by the Office upon request and payment of the necessary fee.

The invention will now be described, by way of example only, with reference to the accompanying drawings, in which:

FIG. 6 illustrates a side-by-side comparison of an input image and a corresponding displayed tissue risk map, according to some examples;

FIG. 7 illustrates an exemplary process for training and testing a GAN model, according to some examples;

DETAILED DESCRIPTION

Figure 1A:
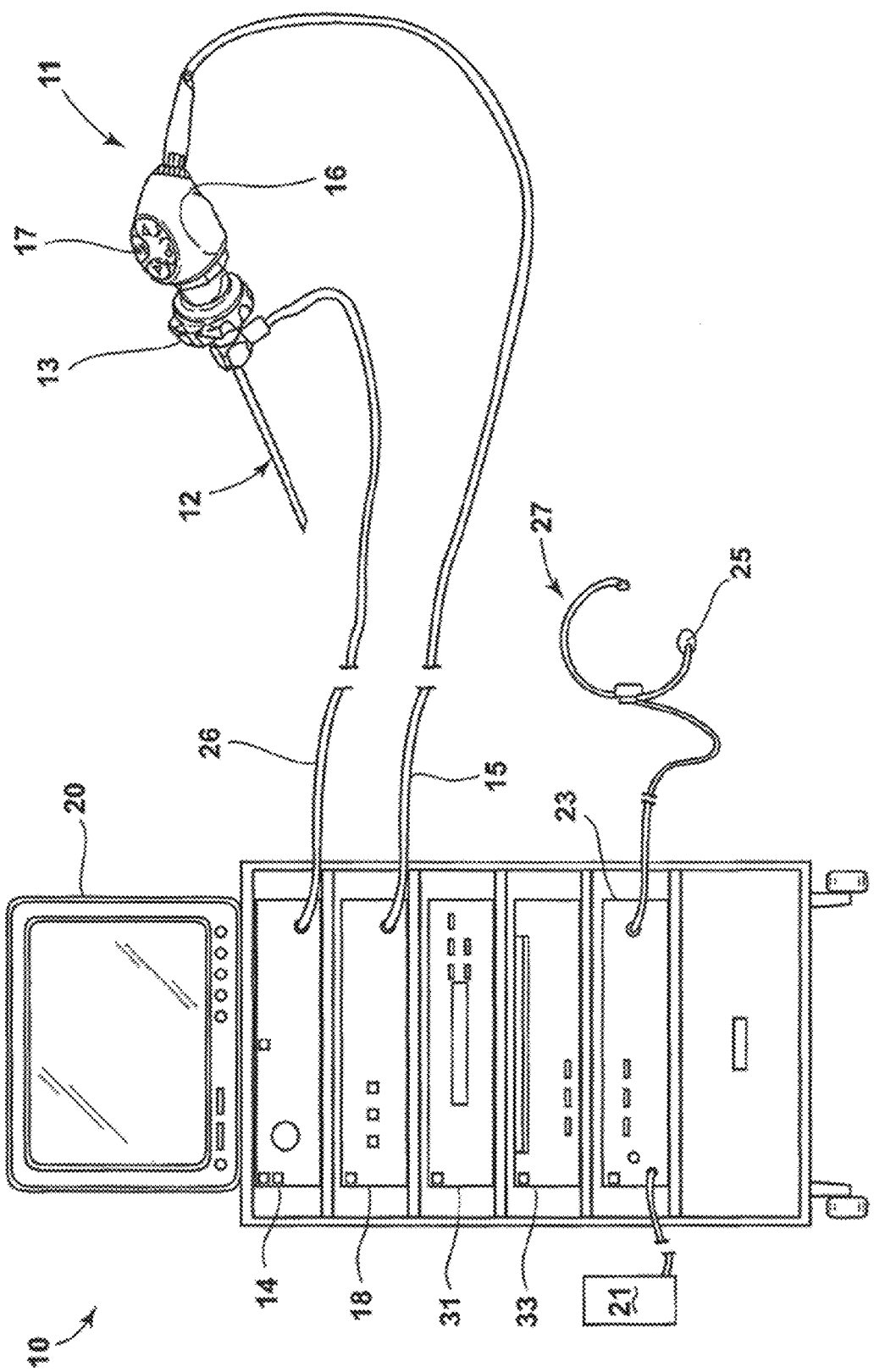
FIG. 1A is an illustration of an endoscopic camera system, according to some examples.

Reference will now be made in detail to implementations and examples of various aspects and variations of systems and methods described herein. Although several exemplary variations of the systems and methods are described herein, other variations of the systems and methods may include aspects of the systems and methods described herein combined in any suitable manner having combinations of all or some of the aspects described. Examples will now be described more fully hereinafter with reference to the accompanying drawings; however, they may be embodied in different forms and should not be construed as limited to the examples set forth herein. Rather, these examples are provided so that this disclosure will be thorough and complete, and will fully convey exemplary implementations to those skilled in the art.

Disclosed herein are exemplary devices, apparatuses, systems, methods, and non-transitory storage media for analyzing medical images, including fluorescence medical images (e.g., NIR medical images). The systems, devices, and methods may be used for imaging tissue of a subject, such as in endoscopic imaging procedures or open field surgical imaging procedures. Imaging may be performed pre-operatively, intra-operatively, post-operatively, during diagnostic imaging sessions and procedures, and during non-diagnostic imaging sessions and procedures. The imaging methods per se may exclude insertion of an endoscopic imager into a lumen in the body or the use of an open field imaging system. The imaging methods per se may exclude any invasive surgical step. The imaging methods per se may exclude any diagnostic step practiced on the human or animal body.

Disclosed herein are exemplary devices, apparatuses, systems, methods, and non-transitory storage media for training a generative adversarial ("GAN") model to generate a tissue risk map to display risk assessment of a tissue of a subject. The GAN model can be trained using unlabeled images associated with a normal future outcome. For example, the GAN model can be trained using unlabeled images of surgical procedures where the patients are known to have recovered timely after the surgical procedures. The trained GAN model can be tested with a combination of labeled normal images and labeled abnormal images. As discussed below, anomaly detection using a GAN model is the task of modeling normal images using the adversarial training process and detecting anomalies in an input image by measuring an anomaly score (i.e., deviation from a normal sample).

In some examples, significantly more unlabeled training images (e.g., >3,000 videos) are used to train the GAN model than the labeled testing images used to test the GAN model. Further, only a subset of the labeled test images are abnormal images (e.g., 10-100 videos). These techniques are advantageous because labeling a large volume of training data can be impractical, error-prone, and expensive. These techniques further bypass the problem of a highly unbalanced dataset, as many medical operations and procedures have a fairly low rate of complications, thus causing the abnormal images to be relatively scarce.

Collecting, labeling, and storing a large volume of training images can lead to inefficient usage of computer memory and processing power. By using unlabeled normal images to train the GAN model, the techniques can lead to better usage and management of computer memory and more efficient usage of compute processing power, thus improving functioning of a computer system. Further, the GAN model can result in more accurate diagnosis and/or treatment of diseases, as discussed herein.

In some examples, the techniques can be applied to any image modality where blood perfusion dynamics is correlated with the outcome and/or diagnostic and where the case distribution is skewed towards normal observations. For example, the system can train the model on fluorescence images acquired from healthy patients (or from healthy tissues of sick patients) and then use the trained model for identification of malignancies (e.g., cancerous vs. benign lesions).

Also disclosed herein are exemplary devices, apparatuses, systems, methods, and non-transitory storage media for generating, based on fluorescence images of a tissue (e.g., captured during a surgery), simulated white-light image that represents a predicted future state of the tissue (e.g., 1-3 weeks after the surgery). In some examples, a GAN model can be trained using unpaired data. In other words, the training dataset does not need to contain a fluorescence image and a white-light image of the same subject. Eliminating the need for paired images is advantageous because paired images can be difficult or even impractical to obtain.

In some examples, the GAN model can be trained using two datasets of images: the perfusion videos and the white-light outcome photos. The images in the two datasets can come from different patients and may not have one-to-one correlations. By using unpaired images to train the GAN model, the techniques can lead to better usage and management of computer memory and more efficient usage of compute processing power, thus improving functioning of a computer system. Further, the GAN model can result in more accurate diagnosis and/or treatment of diseases, as discussed herein.

Also described herein exemplary devices, apparatuses, systems, methods, and non-transitory storage media for using a combination of self-supervised learning and supervised learning techniques to process medical images including fluorescence images. In some examples, a self-supervised encoder is trained using unlabeled images. For example, the unlabeled training images can include image frames from intraoperative videos (e.g., videos of surgical procedures). Different image frames can be sampled from different time points in a video, and they are not labelled with any additional information such as patient's metadata and outcomes. The encoder is trained to receive an input image and transform the input image into a latent representation, which amplifies the general features of the image while minimizing image-specific characteristics. After the encoder is trained, a model that is configured to receive the latent representation to perform a downstream task (e.g., a classification task) can be fine-tuned using training images that are labelled in accordance with the downstream task. The labeled training dataset can include fewer images than the unlabeled training dataset, thus reducing the need to label a large number of medical images.

Collecting, labeling, and storing a large volume of training images can lead to inefficient usage of computer memory and processing power. By training the encoder using unlabeled training data, the techniques can lead to better usage and management of computer memory and more efficient usage of compute processing power, thus improving functioning of a computer system. Further, the GAN model can result in more accurate diagnosis and/or treatment of diseases, as discussed herein.

In the following description, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some examples also relates to a device for performing the operations herein. This device may be specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

FIG. 1A shows an example of an endoscopic imaging system 10, which includes a scope assembly 11 which may be utilized in endoscopic procedures. The scope assembly 11 incorporates an endoscope or scope 12 which is coupled to a camera head 16 by a coupler 13 located at the distal end of the camera head 16. Light is provided to the scope by a light source 14 via a light guide 26, such as a fiber optic cable. The camera head 16 is coupled to a camera control unit (CCU) 18 by an electrical cable 15. The CCU 18 is connected to, and communicates with, the light source 14. Operation of the camera 16 is controlled, in part, by the CCU 18. The cable 15 conveys video image and/or still image data from the camera head 16 to the CCU 18 and may convey various control signals bi-directionally between the camera head 16 and the CCU 18.

A control or switch arrangement 17 may be provided on the camera head 16 for allowing a user to manually control various functions of the system 10, which may include switch from one imaging mode to another, as discussed further below. Voice commands may be input into a microphone 25 mounted on a headset 27 worn by the practitioner and coupled to the voice-control unit 23. A hand-held control device 29, such as a tablet with a touch screen user interface or a PDA, may be coupled to the voice control unit 23 as a further control interface. In the illustrated example, a recorder 31 and a printer 33 are also coupled to the CCU 18. Additional devices, such as an image capture and archiving device, may be included in the system 10 and coupled to the CCU 18. Video image data acquired by the camera head 16 and processed by the CCU 18 is converted to images, which can be displayed on a monitor 20, recorded by recorder 31, and/or used to generate static images, hard copies of which can be produced by the printer 33.

Figure 1B:
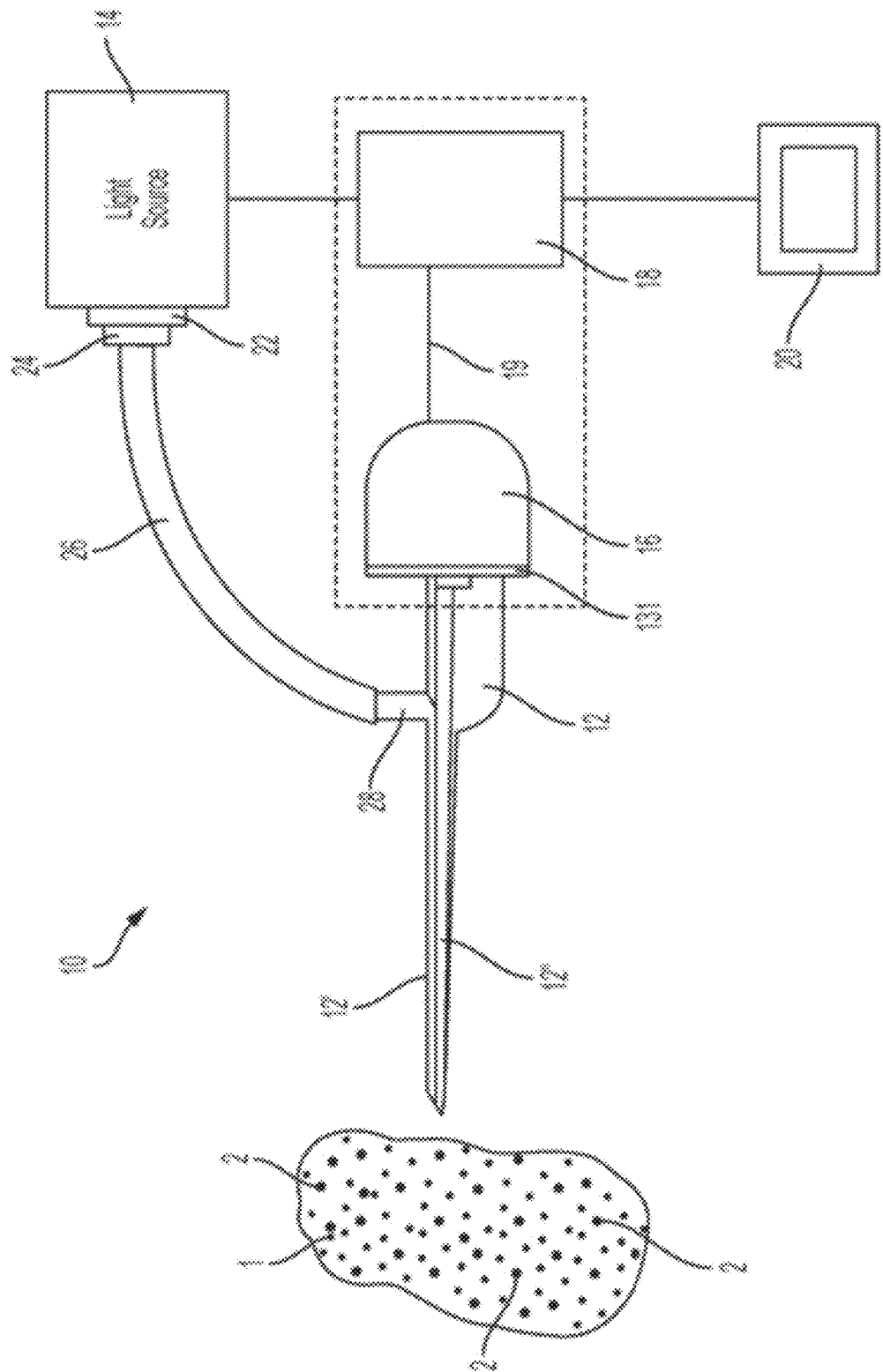
FIG. 1B is a diagram of a portion of the endoscopic camera system of FIG. 1A and a target object for imaging, according to some examples.

FIG. 1B shows an example of a portion of the endoscopic system 10 being used to illuminate and receive light from an object 1, such as a surgical site of a patient. The object 1 may include fluorescent markers 2, for example, as a result of the patient being administered a fluorescence imaging agent. The fluorescent markers 2 may comprise, for example, indocyanine green (ICG).

The light source 14 can generate visible illumination light (such as any combination of red, green, and blue light) for generating visible (e.g., white light) images of the target object 1 and can also produce fluorescence excitation illumination light for exciting the fluorescent markers 2 in the target object for generating fluorescence images. Illumination light is transmitted to and through an optic lens system 22 which focuses light onto a light pipe 24. The light pipe 24 may create a homogeneous light, which is then transmitted to the fiber optic light guide 26. The light guide 26 may include multiple optic fibers and is connected to a light post 28, which is part of the endoscope 12. The endoscope 12 includes an illumination pathway 12' and an optical channel pathway 12".

The endoscope 12 may include a notch filter 131 that allows some or all (preferably, at least 80%) of fluorescence emission light (e.g., in a wavelength range of 830 nm to 870 nm) emitted by fluorescence markers 2 in the target object 1 to pass therethrough and that allows some or all (preferably, at least 80%) of visible light (e.g., in the wavelength range of 400 nm to 700 nm), such as visible illumination light reflected by the target object 1, to pass therethrough, but that blocks substantially all of the fluorescence excitation light (e.g., infrared light having a wavelength of 808 nm) that is used to excite fluorescence emission from the fluorescent marker 2 in the target object 1. The notch filter 131 may have an optical density of OD5 or higher. In some examples, the notch filter 131 can be located in the coupler 13.

Figure 2:
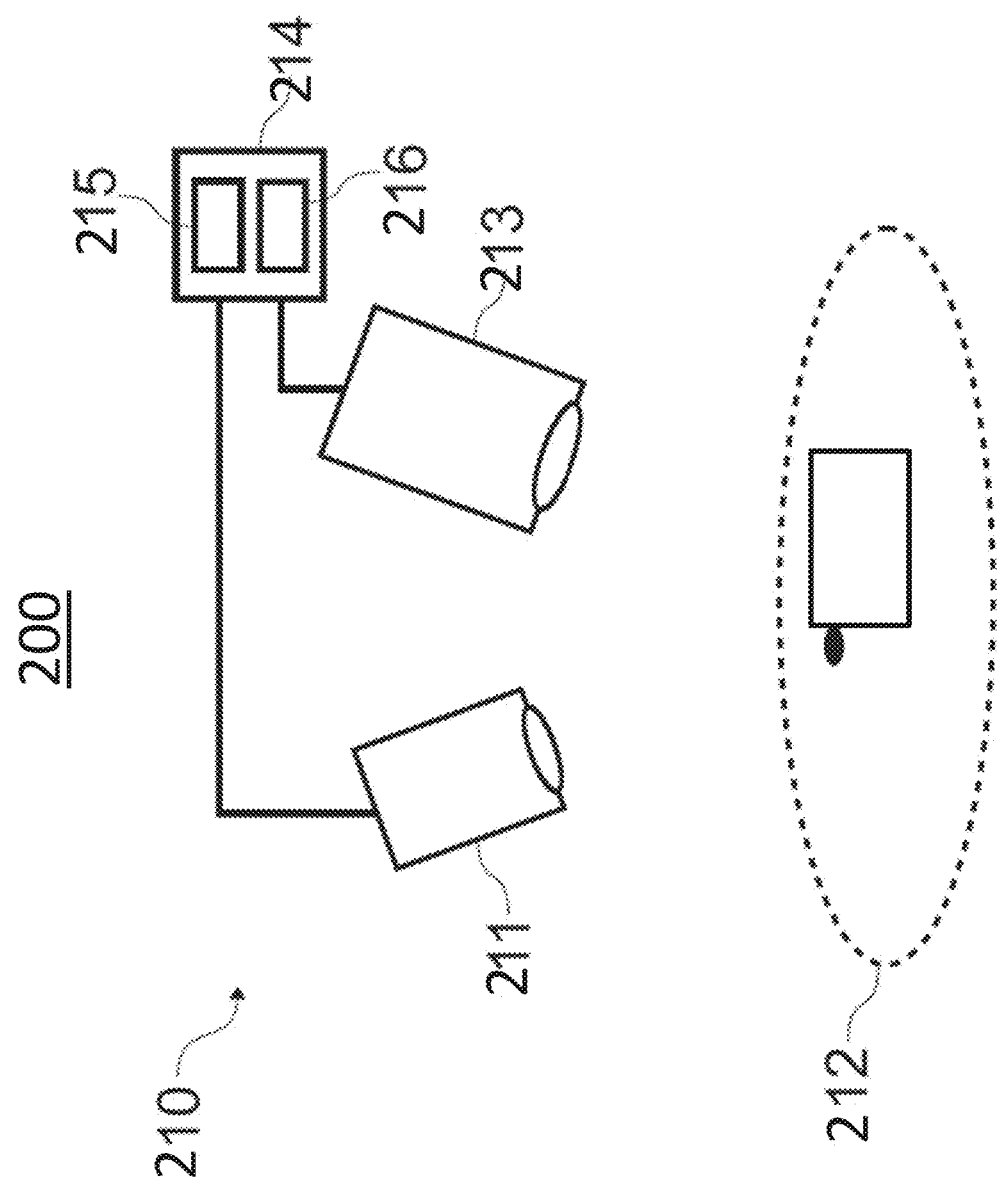
FIG. 2 illustrates a schematic view of a system for illumination and imaging according to some examples.

FIG. 2 illustrates an exemplary open field imaging system in accordance with some examples. FIG. 2 illustrates a schematic view of an illumination and imaging system 210 that can be used in open field surgical procedures. As may be seen therein, the system 210 may include an illumination module 211, an imaging module 213, and a video processor/illuminator (VPI) 214. The VPI 214 may include an illumination source 215 to provide illumination to the illumination module 211 and a processor assembly 216 to send control signals and to receive data about light detected by the imaging module 213 from a target 212 illuminated by light output by the illumination module 211. In one variation, the video processor/illuminator 214 may comprise a separately housed illumination source 215 and the processor assembly 216. In one variation, the video processor/illuminator 214 may comprise the processor assembly 216 while one or more illumination sources 215 are separately contained within the housing of the illumination module 211. The illumination source 215 may output light at different waveband regions, e.g., white (RGB) light, excitation light to induce fluorescence in the target 212, a combination thereof, and so forth, depending on characteristics to be examined and the material of the target 212. Light at different wavebands may be output by the illumination source 215 simultaneously, sequentially, or both. The illumination and imaging system 210 may be used, for example, to facilitate medical (e.g., surgical) decision making e.g., during a surgical procedure. The target 212 may be a topographically complex target, e.g., a biological material including tissue, an anatomical structure, other objects with contours and shapes resulting in shadowing when illuminated, and so forth. The VPI 214 may record, process, display, and so forth, the resulting images and associated information.

Figure 3:
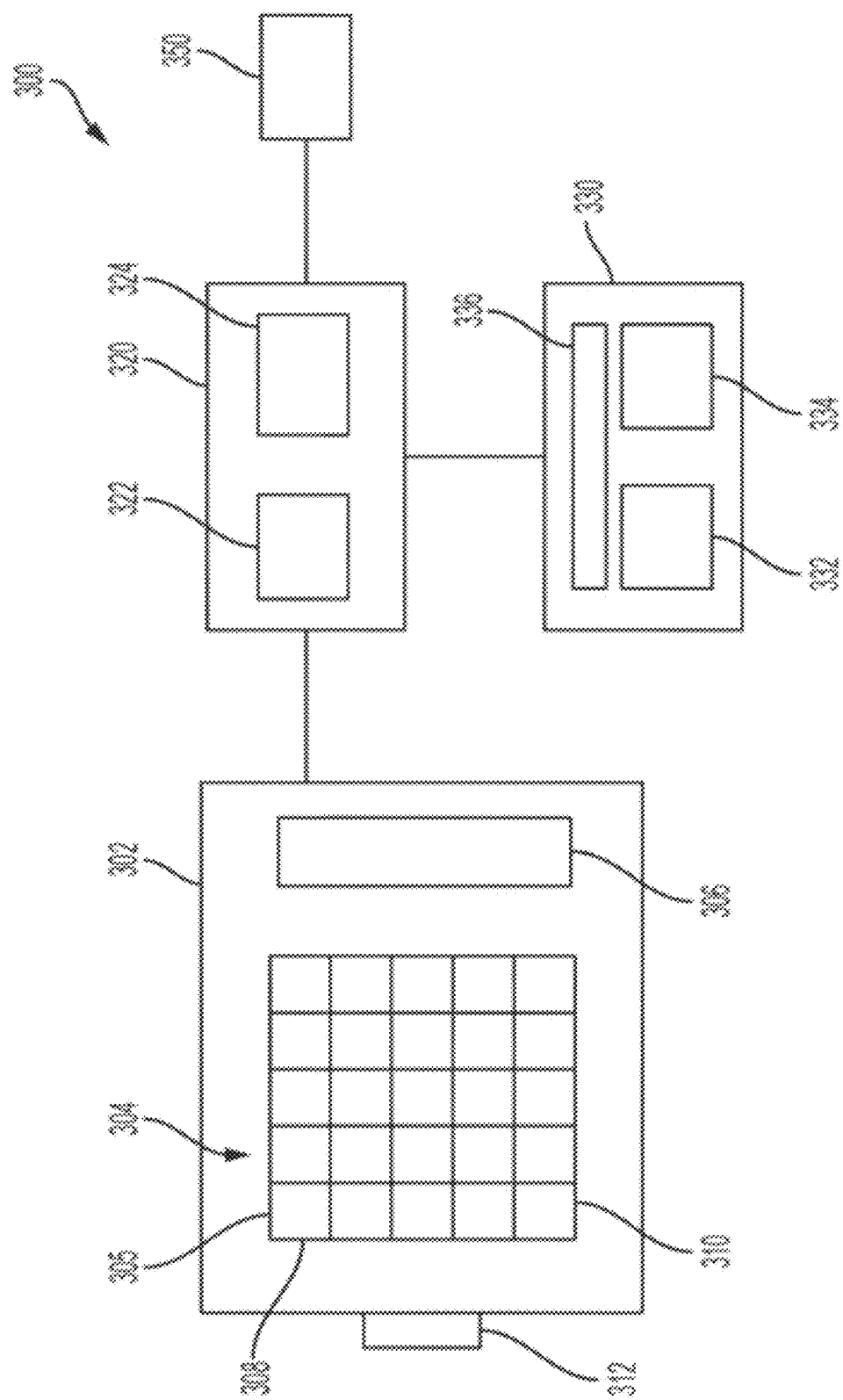
FIG. 3 is a block diagram of an imaging system, according to some examples.

FIG. 3 schematically illustrates an exemplary imaging system 300 that employs an electronic imager 302 to generate images (e.g., still and/or video) of a target object, such as a target tissue of a patient, according to some examples. The imager 302 may be a rolling shutter imager (e.g., CMOS sensors) or a global shutter imager (e.g., CCD sensors). System 300 may be used, for example, for the endoscopic imaging system 10 of FIG. 1A. The imager 302 includes a CMOS sensor 304 having an array of pixels 305 arranged in rows of pixels 308 and columns of pixels 310. The imager 302 may include control components 306 that control the signals generated by the CMOS sensor 304. Examples of control components include gain circuitry for generating a multi-bit signal indicative of light incident on each pixel of the sensor 304, one or more analog-to-digital converters, one or more line drivers to act as a buffer and provide driving power for the sensor 304, row circuitry, and timing circuitry. A timing circuit may include components such as a bias circuit, a clock/timing generation circuit, and/or an oscillator. Row circuitry may enable one or more processing and/or operational tasks such as addressing rows of pixels 308, addressing columns of pixels 310, resetting charge on rows of pixels 308, enabling exposure of pixels 305, decoding signals, amplifying signals, analog-to-digital signal conversion, applying timing, read out and reset signals and other suitable processes or tasks. Imager 302 may also include a mechanical shutter 312 that may be used, for example, to control exposure of the image sensor 304 and/or to control an amount of light received at the image sensor 304.

One or more control components may be integrated into the same integrated circuit in which the sensor 304 is integrated or may be discrete components. The imager 302 may be incorporated into an imaging head, such as camera head 16 of system 10.

One or more control components 306, such as row circuitry and a timing circuit, may be electrically connected to an imaging controller 320, such as camera control unit 18 of system 10. The imaging controller 320 may include one or more processors 322 and memory 324. The imaging controller 320 receives imager row readouts and may control readout timings and other imager operations, including mechanical shutter operation. The imaging controller 320 may generate image frames, such as video frames from the row and/or column readouts from the imager 302. Generated frames may be provided to a display 350 for display to a user, such as a surgeon.

The system 300 in this example includes a light source 330 for illuminating a target scene. The light source 330 is controlled by the imaging controller 320. The imaging controller 320 may determine the type of illumination provided by the light source 330 (e.g., white light, fluorescence excitation light, or both), the intensity of the illumination provided by the light source 330, and or the on/off times of illumination in synchronization with rolling shutter operation. The light source 330 may include a first light generator 332 for generating light in a first wavelength and a second light generator 334 for generating light in a second wavelength. For example, in some examples, the first light generator 332 is a white light generator, which may be comprised of multiple discrete light generation components (e.g., multiple LEDs of different colors), and the second light generator 334 is a fluorescence excitation light generator, such as a laser diode.

The light source 330 includes a controller 336 for controlling light output of the light generators. The controller 336 may be configured to provide pulse width modulation of the light generators for modulating intensity of light provided by the light source 330, which can be used to manage over-exposure and under-exposure. In some examples, nominal current and/or voltage of each light generator remains constant and the light intensity is modulated by switching the light generators (e.g., LEDs) on and off according to a pulse width control signal. In some examples, a PWM control signal is provided by the imaging controller 336. This control signal can be a waveform that corresponds to the desired pulse width modulated operation of light generators.

The imaging controller 320 may be configured to determine the illumination intensity required of the light source 330 and may generate a PWM signal that is communicated to the light source 330. In some examples, depending on the amount of light received at the sensor 304 and the integration times, the light source may be pulsed at different rates to alter the intensity of illumination light at the target scene. The imaging controller 320 may determine a required illumination light intensity for a subsequent frame based on an amount of light received at the sensor 304 in a current frame and/or one or more previous frames. In some examples, the imaging controller 320 is capable of controlling pixel intensities via PWM of the light source 330 (to increase/decrease the amount of light at the pixels), via operation of the mechanical shutter 312 (to increase/decrease the amount of light at the pixels), and/or via changes in gain (to increase/decrease sensitivity of the pixels to received light). In some examples, the imaging controller 320 primarily uses PWM of the illumination source for controlling pixel intensities while holding the shutter open (or at least not operating the shutter) and maintaining gain levels. The controller 320 may operate the shutter 312 and/or modify the gain in the event that the light intensity is at a maximum or minimum and further adjustment is needed.

Generating Tissue Risk Maps Using GAN Models

Disclosed herein are exemplary devices, apparatuses, systems, methods, and non-transitory storage media for training a generative adversarial ("GAN") model to generate a tissue risk map to display risk assessment of a tissue of a subject. The GAN model can be trained using unlabeled images associated with a normal future outcome. For example, the GAN model can be trained using unlabeled images of surgical procedures where the patients are known to have recovered timely after the surgical procedures. The trained GAN model can be tested with a combination of labeled normal images and labeled abnormal images. As discussed below, anomaly detection using a GAN model is the task of modeling normal images using the adversarial training process and detecting anomalies in an input image by measuring an anomaly score (i.e., deviation from a normal sample).

In some examples, significantly more unlabeled training images (e.g., >3,000 videos) are used to train the GAN model than the labeled testing images used to test the GAN model. Further, only a subset of the labeled test images are abnormal images (e.g., 10-100 videos). These techniques are advantageous because labeling a large volume of training data can be impractical, error-prone, and expensive. These techniques further bypass the problem of a highly unbalanced dataset, as many medical operations and procedures have a fairly low rate of complications, thus causing the abnormal images to be relatively scarce.

Collecting, labeling, and storing a large volume of training images can lead to inefficient usage of computer memory and processing power. By using unlabeled normal images to train the GAN model, the techniques can lead to better usage and management of computer memory and more efficient usage of compute processing power, thus improving functioning of a computer system. Further, the GAN model can result in more accurate diagnosis and/or treatment of diseases, as discussed herein.

In some examples, the techniques can be applied to any image modality where blood perfusion dynamics is correlated with the outcome and/or diagnostic and where the case distribution is skewed towards normal observations. For example, the system can train the model on fluorescence images acquired from healthy patients (or from healthy tissues of sick patients) and then use the trained model for identification of malignancies (e.g., cancerous vs. benign lesions).

Figure 4:
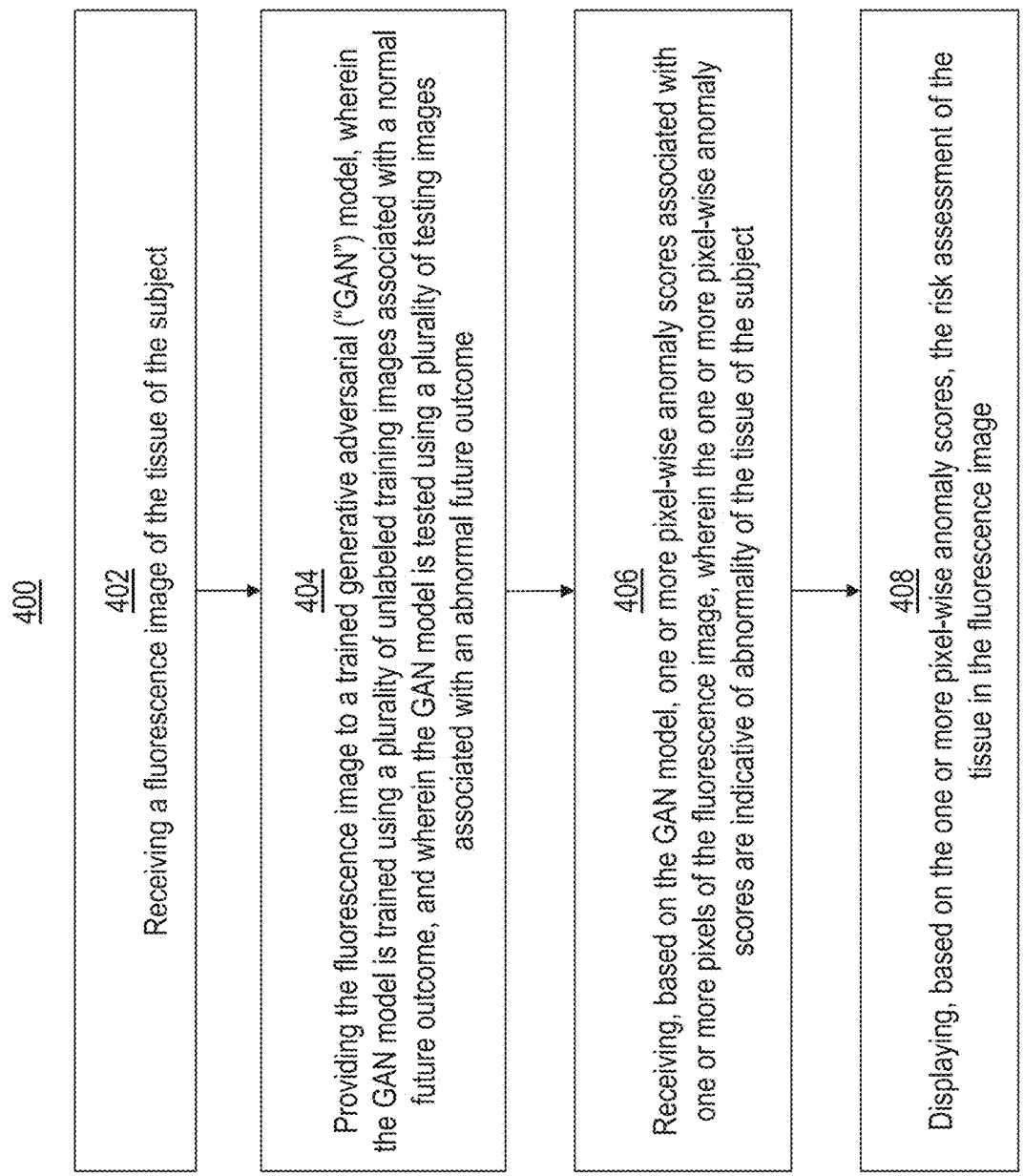
FIG. 4 illustrates an exemplary method of displaying a risk assessment of a tissue of a subject, according to some examples.

FIG. 4 illustrates an exemplary method 400 for displaying risk assessment of a tissue of a subject, according to some examples. Process 400 is performed, for example, using one or more electronic devices implementing a software platform. In some examples, process 400 is performed using a client-server system, and the blocks of process 400 are divided up in any manner between the server and one or more client devices. In some examples, process 400 is performed using only a client device or only multiple client devices. In process 400, some blocks are, optionally, combined, the order of some blocks is, optionally, changed, and some blocks are, optionally, omitted. In some examples, additional steps may be performed in combination with the process 400. Accordingly, the operations as illustrated (and described in greater detail below) are exemplary by nature and, as such, should not be viewed as limiting.

At block 402, an exemplary system (e.g., one or more electronic devices) receives a medical image of a tissue of a subject. In some examples, the medical image is a florescence image (e.g., a near-infrared or "NIR" image) of the tissue of the subject. In some examples, the fluorescence image is an intraoperative perfusion image of the tissue of the subject (e.g., sampled from an intraoperative perfusion video of the tissue). The tissue can be any biological tissue, such as breast tissue, a colon tissue, etc.

At block 404, the system provides the fluorescence image to a trained generative adversarial ("GAN") model. At block 406, the system obtains, based on one or more outputs of the GAN model, one or more pixel-wise anomaly scores associated with one or more pixels of the fluorescence image. The one or more pixel-wise anomaly scores are indicative of abnormality of the imaged tissue of the subject.

Figure 5:
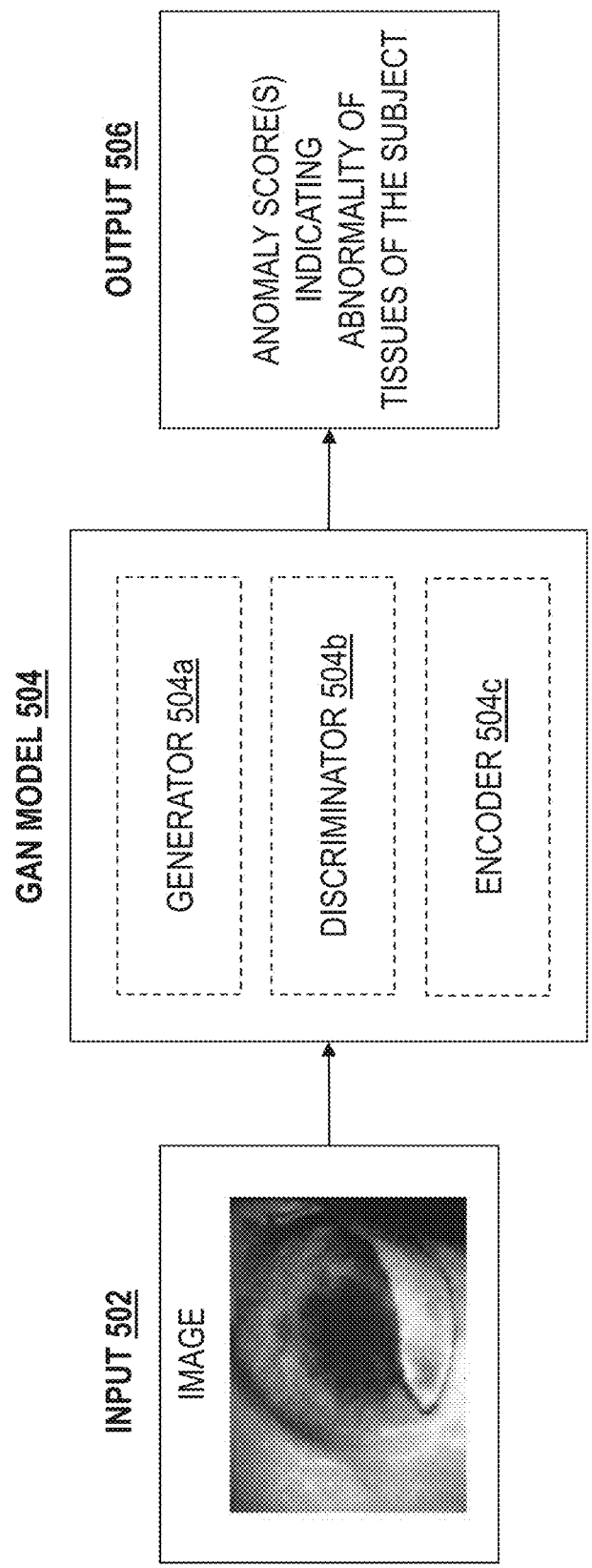
FIG. 5 illustrates an exemplary GAN model, according to some examples.

FIG. 5 illustrates an exemplary GAN model, according to some examples. With reference to FIG. 5, an input image 502 (e.g., a fluorescence perfusion image of breast tissue) is provided to a trained GAN model 504. The GAN model 504 outputs one or more anomaly scores. The one or more anomaly scores can be a plurality of pixel-wise scores, an image-wise score, or a combination thereof. In the depicted example, the GAN model comprises a generator 504a, a discriminator 504b, and an encoder 504c. Exemplary implementations of the GAN model are described herein with reference to FIGS. 8A-8B and 9.

Returning to FIG. 4, at block 408, the system displays, based on the one or more pixel-wise anomaly scores, the risk assessment (e.g., a tissue risk map) of the tissue in the fluorescence image. In some examples, the risk assessment comprises a color overlay on the fluorescence image. In some examples, the system can compare each pixel-wise anomaly score with one or more pixel-wise thresholds and determine the pixel-wise colors of the color overlay based on the comparison.

FIG. 6 illustrates a side-by-side comparison of an input image 602 and the displayed tissue risk map 604. The input image 602 is a perfusion fluorescence image of breast tissue during a plastic-reconstructive surgery. The input image can be provided to the GAN model to obtain a plurality of pixel-wise anomaly scores. Each pixel-wise anomaly score is compared against a pixel-wise threshold. If the pixel-wise score exceeds the threshold, a color overlay is provided for that pixel, thus resulting in the tissue risk map 604. The color overlay 606 in the tissue risk map 604 indicates a tissue area that is likely to develop a complication. In some examples, color intensity of the color overlay can be indicative of the corresponding pixel-wise anomaly score. For example, a higher color intensity can be indicative of a higher anomaly score.

In some examples, the tissue risk map (e.g., 604) can be provided (e.g., displayed) to a medical practitioner, who can review the image to identify, recommend, and/or administer a treatment to the patient. In some examples, the tissue risk map can be provided to a computer-based system, which processes the image to identify, recommend, and/or administer a treatment to the patient. For example, the system can provide the tissue risk map to a classification model to automatically identify an issue. Based on the identified issue, a treatment can be automatically recommended (e.g., via one or more graphical user interfaces). The treatment can also be automatically administered, for example, by a medical device (e.g., a surgical robot) based on the automatically recommended treatment.

In some examples, the system calculates an image-wise anomaly score (e.g., based on the one or more pixel-wise anomaly scores, outputs of the GAN model). The system can predict a future medical outcome (e.g., high, medium, low risk of complication) of the tissue of the subject based on the image-wise anomaly score by comparing the image-wise anomaly score with a predefined image-wise threshold. In some examples, the system issues an alert, provides a recommendation, or administers a treatment based on the predicted future outcome of the tissue of the subject. In some examples, the image-wise and/or pixel-wise anomaly scores can be displayed. In some examples, the anomaly scores can be tracked and monitored over time.

FIG. 7 illustrates an exemplary process 700 for training and testing a GAN model, according to some examples. The GAN model can be the GAN model described with reference to FIGS. 4-6. Process 700 is performed, for example, using one or more electronic devices implementing a software platform. In some examples, process 700 is performed using a client-server system, and the blocks of process 700 are divided up in any manner between the server and one or more client devices. In some examples, process 700 is performed using only a client device or only multiple client devices. In process 700, some blocks are, optionally, combined, the order of some blocks is, optionally, changed, and some blocks are, optionally, omitted. In some examples, additional steps may be performed in combination with the process 700. Accordingly, the operations as illustrated (and described in greater detail below) are exemplary by nature and, as such, should not be viewed as limiting.

At block 702, an exemplary system (e.g., one or more electronic devices) collects a plurality of training images and a plurality of testing images. The plurality of training images comprises a plurality of unlabeled images only associated with a normal future outcome and does not comprise any images associated with an abnormal future outcome. For example, the training images can be a plurality of intraoperative perfusion images and/or perfusion videos of one or more tissues of one or more patients during surgical operations, where the one or more tissues are known to have had a timely post-operation recovery. The training images do not need to be labelled after they are collected.

The definition of a normal outcome and an abnormal outcome can vary. In some examples, a GAN model is trained to analyze an image of a particular modality. The modality may correspond to a specific image type (e.g., fluorescence images, white-light images), a specific tissue (e.g., images of breast tissue, images of colon tissue), a specific procedure (e.g., images associated with a plastic surgery), a specific patient type, a specific potential disease, etc. Thus, the definitions of normal and abnormal outcomes may vary based on the modality. For example, for a GAN trained to analyze images associated with a plastic-reconstructive surgery, a normal outcome may include no severe skin damage (e.g., necrosis) one week after the surgery. The images in the training set, therefore, must only contain images of patients falling into this normal category. For a GAN trained to analyze images of potential malignancies, normal images may include images of the patients for whom biopsy results turned out to be negative.

At block 704, the GAN model is trained using the plurality of unlabeled training images. As discussed above, the training images comprise a plurality of unlabeled training images associated with a normal future outcome and no images associated with an abnormal future outcome. In some examples, the training images can be preprocessed. For example, the images may be cropped, rotated, segmented, aligned, etc. Artificial noise may be introduced to simulate known noise (e.g., from imaging equipment). In some examples, each image is represented as an n-dimensional array (e.g., 2-dimensional for greyscale images and 3-dimensional for RGB images).

Figure 8A:
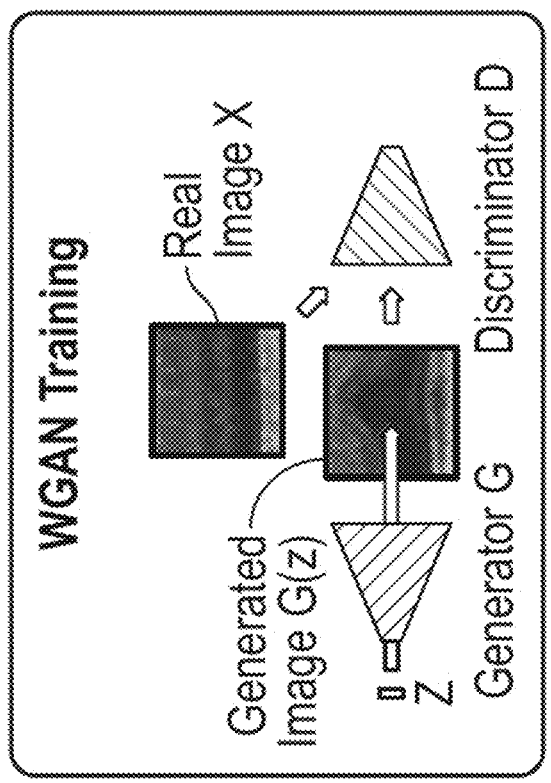
FIG. 8A illustrate an exemplary training process of an exemplary GAN model, according to some examples.
Figure 8B:
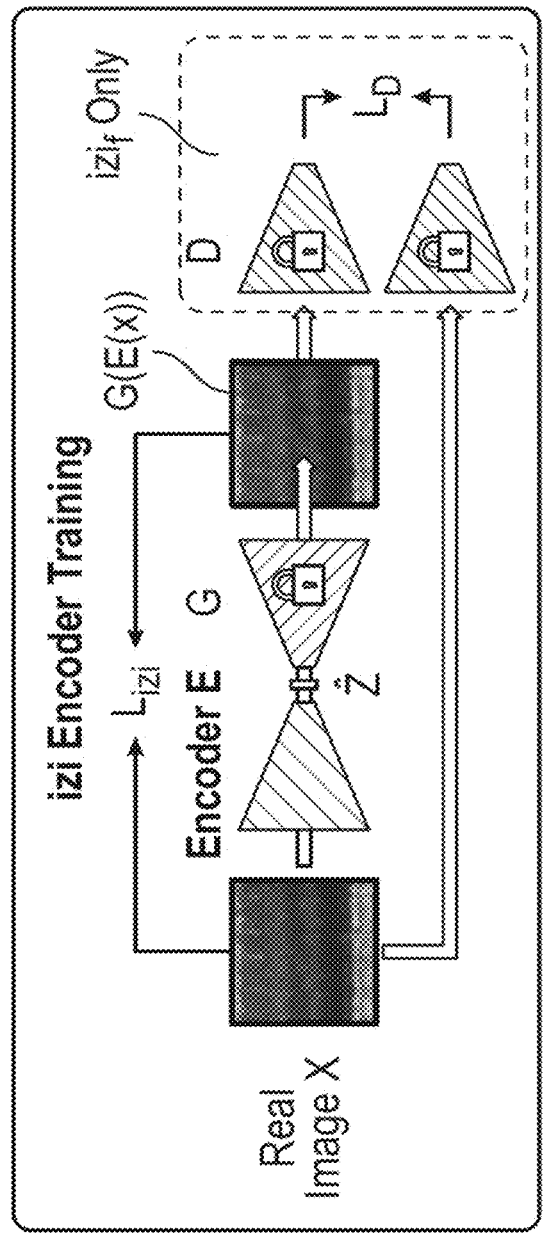
FIG. 8B illustrate an exemplary training process of an exemplary GAN model, according to some examples.

FIGS. 8A-B illustrate an exemplary training process of an exemplary GAN model, according to some examples. With reference to FIGS. 8A-B, the GAN model comprises a generator G, a discriminator D, and an encoder E. The generator G is configured to receive a latent vector and generate an output image. The discriminator D is configured to measure a distance between two images. The encoder E is configured to receive an input image and output a latent vector. In some examples, the GAN model is an f-AnoGAN model.

In some examples, the GAN model is trained by first training the generator G and the discriminator D (as shown in FIG. 8A) and then training the encoder E while the generator G and the discriminator D remain fixed (as shown in FIG. 8B). Both steps involve unlabeled training images associated only with normal future outcomes.

With reference to FIG. 8A, the generator G receives a latent vector, z, and transforms the latent vector into a generated image G(z). The discriminator D then measures the distance between the generated image G(z) and a real image x (e.g., a training image collected in block 702). In some examples, the generator and the discriminator are implemented as a Wasserstein GAN (WGAN) model, and the distance is calculated using the Wasserstein loss functions.

In one implementation, the discriminator loss function is: f(x)−f(G(z)) where f(x) is the discriminator's output for a real image and f(G(z)) is the discriminator's output for a fake/generated image. The discriminator is configured to maximize this function. In other words, it is configured to maximize the difference between its output on real images and its output on generated images.

Further, the generator loss function is: f(G(z)). The generator is configured to maximize this function. In other words, it is configured to maximize the discriminator's output for its fake (or generated) images.

Upon completion of the training, the generator G learns to generate images of the training distribution capturing normal variability. The discriminator D can estimate the fit of generated images to the distribution of training images. Thus, the process in FIG. 8A yields a trained generator and a trained discriminator. The trained generator and discriminator are utilized with fixed weights for subsequent encoder training.

With reference to FIG. 8B, the encoder is trained while the trained generator G and the trained discriminator D remain fixed. The trainable encoder E maps an input image to the latent space (z-space) to obtain a latent vector. The output of the encoder is connected to the generator, which acts as a decoder in an autoencoder architecture and maps the latent vector into image space to obtain a generated image.

During training, a training image x (e.g., an image collected in block 704) is provided to the encoder E to obtain a latent vector $\hat{z}$ or E(x). The latent vector is then provided to the trained generator G to obtain a generated image G(E(x)). A first loss is calculated based on the difference between the generated image G(E(x)) and the real image x. Further, the generated image G(E(x)) and the real image x are provided to the trained discriminator D to obtain a second loss based on the difference between f(x) and f(G(E(x))) as described above. In some examples, the total loss function is defined as follows:

$$\mathcal{L}_{izi_f}(x) = \frac{1}{n} \cdot \|x - G(E(x))\|^2 + \frac{k}{n_d} \cdot \|f(x) - f(G(E(x)))\|^2,$$

where $\|\cdot\|_2$ is the sum of squared pixel-wise residuals of gray values, n is the number of pixels in an image, discriminator features f(·) of an intermediate layer are used as statistics of a given input, $n_d$ is the dimensionality of the intermediate feature representation, and k is a weighting factor.

Based on the total loss, the encoder is updated. The encoder is trained in FIG. 8B with the same data used in WGAN training in FIG. 8A, and the parameters of both the discriminator and the generator are those learned during WGAN training and are kept fixed during encoder training.

The trained GAN model in FIGS. 8A-B can be used to analyze an unknown image and calculate anomaly scores. The input image x is provided to the trained encoder to obtain a latent vector E(x). The latent vector is provided to the trained generator to obtain a generated image G(E(x)). A first difference is calculated between the input image x and the generated image G(E(x)). A second difference is calculated by providing the two images to the trained discriminator.

The anomaly scores are calculated based on the first difference and the second difference. In some examples, the pixel-wise abnormality score is:

$$\mathcal{A}_R(x) = |x - G(E(x))|,$$

Further, the image-wise anomaly score, A(x), for a new image x is defined by:

$$\mathcal{A}(x) = \mathcal{A}_R(x) + \kappa \cdot \mathcal{A}_D(x),$$

where k is a weighting factor and $$\mathcal{A}_R(x) = \frac{1}{n} \cdot \|x - G(E(x))\|^2, \mathcal{A}_D(x) = \frac{1}{n_d} \cdot \|f(x) - f(G(E(x)))\|^2$$

In general, this formulation yields higher anomaly scores on anomalous images and lower anomaly scores on normal images. Since the model is only trained using normal images, it performs better when reconstructing an input image lying on the manifold of normal images X The reconstructed images have smaller deviations when the input images are normal images, and larger deviations when the input images are abnormal images.

Further, the system can empirically define an image-wise threshold, Amax, that can be used to classify the input images as 'normal' (A(x)≤Amax) or 'anomalous' (A(x)>Amax). Further, a pixel-wise threshold can be defined, allowing the system to visualize normal and abnormal pixels differently, as described herein.

Figure 9:
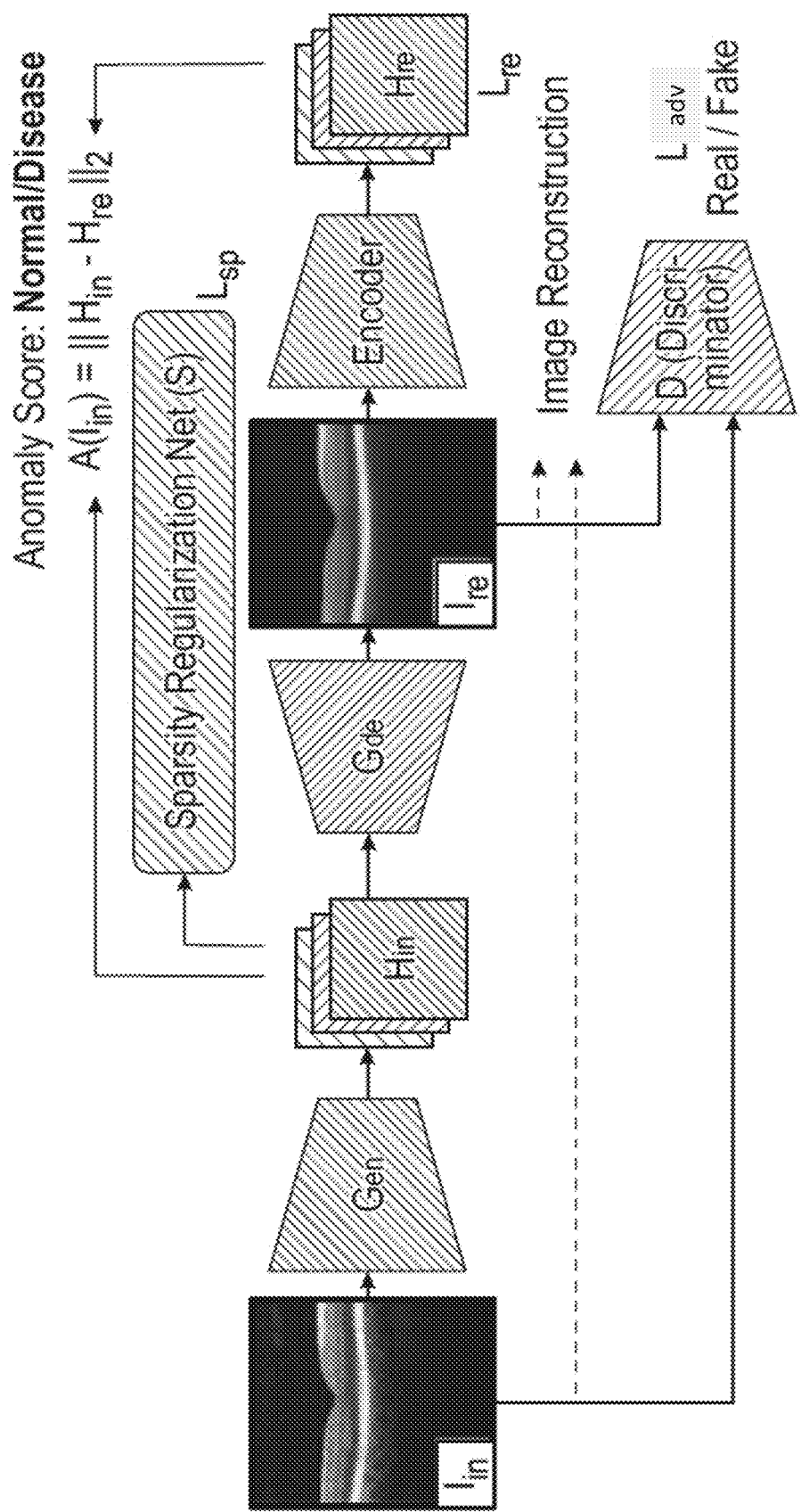
FIG. 9 illustrates another exemplary training process of an exemplary GAN model, according to some examples.

FIG. 9 illustrates another exemplary training process of an exemplary GAN model, according to some examples. Unlike the GAN model in FIGS. 8A-B, the GAN architecture in FIG. 9 is trained end-to-end (e.g., there are no separate training steps for the generator/discriminator and the encoder). Further, it computes the anomaly score in latent space instead of the image space, thus alleviating the effect of image noise, as discussed herein. To further improve model performance for anomaly detection and facilitate model interpretability, a novel Sparsity Regularization Net is introduced that adds a regularization component to the adversarial loss function, as discussed herein. In some examples, the GAN model is a Sparse-GAN model.

The GAN model comprises a generator (represented by $G_{en}$ and $G_{de}$), a discriminator D, and an encoder. The generator is configured to receive an input image, translate the input image $I_{in}$ into a latent vector (using $G_{en}$), and translate the latent vector into a generated image $I_{re}$ (using $G_{de}$). The discriminator D is configured to measure a distance between two images. In the depicted example, the encoder is configured to map the generated image into the latent space to obtain a latent vector. In some examples, the encoder has the same weights as $G_{en}$. In some examples, the generator and the discriminator can be implemented based on the image-to-image conditional GAN architecture, pix2pix.

During training, a training image $I_{in}$ (e.g., collected in block 702 in FIG. 7) is provided to the generator to obtain a latent vector and a generated image $I_{re}$. A first loss is calculated based on the training image $I_{in}$ and the generated image $I_{re}$. Further, the two images are provided to the discriminator to obtain a second loss. The total loss function can be calculated as:

$$\mathcal{L} = \lambda_{re}\mathcal{L}_{re} + \lambda_{adv} \max_D (\mathcal{L}_{adv}) + \lambda_{sp}\mathcal{L}_{sp},$$

where Lre is the reconstruction loss (i.e., the first loss), Ladv is the adversarial loss (i.e., the second loss), Lsp is the sparsity loss, and the λ values are their corresponding regularization parameters. The architecture is updated based on the loss.

The trained GAN model in FIG. 9 can be used to analyze an unknown image and calculate anomaly scores. The image $I_{in}$ is provided to the trained generator to obtain a first latent vector $H_{in}$ and a generated image $I_{re}$. The generated image $I_{re}$ is provided to the trained encoder to obtain a second latent vector $H_{re}$. The anomaly score can be calculated based on the first latent vector and the second latent vector.

In some examples, the image-wise anomaly score, $A(I_{in})$, for the input image, $I_{in}$, and diagnosis results, $C(I_{in})$, is calculated as follows:

$$\mathcal{A}(I_{in}) = \|H_{in} - H_{re}\|_2 = \|G_{en}(I_{in}) - E(G(I_{in}))\|_2$$

$$C(I_{in}) = \begin{cases} \text{normal,} & \text{if } \mathcal{A}(I_{in}) < \phi \\ \text{disease,} & \text{if } \mathcal{A}(I_{in}) \geq \phi \end{cases}$$

where φ is the empirically determined anomaly score threshold (similar to Amax described herein).

Pixel-wise anomaly scores can be visualized as by performing Global Average Pooling (GAP) for latent vectors $H_{in}$ and $H_{re}$. The anomaly vector $W_{aam}$ can be obtained as:

$$W_{aam} = \|GAP(H_{in}) - GAP(H_{re})\|_1,$$

The system can multiply the feature map $H_{in}$ by the anomaly vector in channel-wise fashion to obtain an anomaly activation map for display to highlight the anomalous regions within the input image. In some examples, the anomaly activation map is a region-wise map rather than a pixel-wise one. The system can compute the anomaly vector using the formula above. The vector has the dimension $W_{aam} = w_1, w_2, \ldots, w_n$, where n is the number of channels of the latent feature $H_{in}$. For example, if the latent feature $H_{in}$ has the dimensions 1024×7×7, it has n=1024 channels, each channel represented by a 7×7 feature map. When $H_{in}$ is passed through the GAP layer, each feature map is replaced with its average, yielding a vector of 1024 values. Next, the system multiplies each 7×7 feature map of $H_{in}$ (there are 1024 of them, same as the number of channels) by their corresponding weight from $W_{aam}$ vector and then add them up to receive the final 7×7 anomaly activation map.

In some examples, to impose the anomaly activation map on the input image which has a higher resolution, the system can upscale the anomaly activation map to the size of the input image and then overlay it on top of the input. This results in a region-wise visualization of anomalies detected in the input image.

In some examples, an exemplary GAN model can be trained to obtain a set of attributes that most significantly affect the classification of a fluorescence image of a tissue as necrotic. Unlike the GAN models in FIGS. 8A-B and 9, the GAN architecture can include a classifier to predict the probability that a tissue in a fluorescence image is necrotic. A classifier-specific StyleSpace, a disentangled latent space containing individual semantically meaningful attributes that affect the classifier's probability predictions, can then be searched to obtain the attributes that most significantly affect the classification. In some examples, the GAN model is a StyleGAN model.

The StyleGAN model comprises a pre-trained classifier, a StyleGAN generator, an encoder, a reconstruction loss, and a classification loss. The classifier is configured to receive a latent representation of an image and provide a classification result indicating the probability that the tissue in the received image is necrotic. The classifier can be pre-trained using labeled perfusion images. Exemplary training of a classifier is described below with reference to FIGS. 13 and 14. The StyleGAN generator is trained to satisfy the pre-trained classifier in order to encourage the generator's StyleSpace to accommodate classifier-specific attributes. The generator is configured to receive an input image, translate the input image into a latent vector, and translate the latent vector into an output image. The generator is trained together with an encoder using a reconstruction loss, which forces the generated output image to be visually similar to the input image. The encoder is configured to receive an input image and output a latent vector. The generator is also trained with a classification loss, which forces the classifier's probability prediction for the generated image to be the same as the classifier's probability prediction for the input image, such that subtle visual details important to the classifier will be included in the generated image.

The classifier in the StyleGAN model can be used to obtain a classification of a tissue in a fluorescence image. The classification can include an indication of the probability that the tissue is necrotic. The StyleSpace of the generator of the StyleGAN model can be searched for attributes that significantly affect the classifier's probability prediction. Each StyleSpace coordinate can be manipulated and its effect on the classifier's probability prediction measured. The top attributes that maximize the change in the classifier's probability prediction for a given fluorescence image are designated the top-K attributes for that image. The set of one or more top-K attributes can be displayed on an interactive user interface.

An interactive user interface displaying the set of one or more top-K style attributes can include a control panel configured to manipulate the set of one or more top-K attributes and visualize the effect of each top-K attribute on the classification of the fluorescence image. The control panel can include sliders that a user can move to manipulate the degree to which each top-K attribute is present in the image and visualize the corresponding change in the classifier's probability prediction.

Figure 17A:
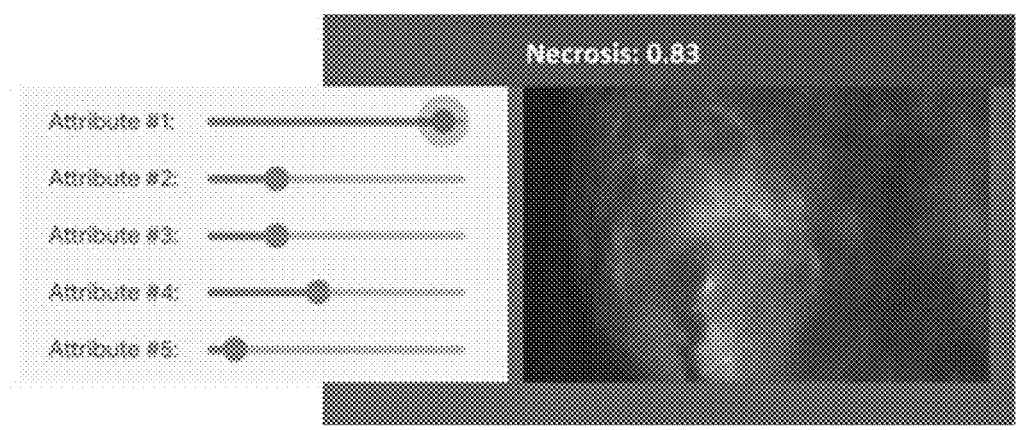
FIG. 17A illustrates an exemplary interactive user interface, in accordance with some examples.
Figure 17B:
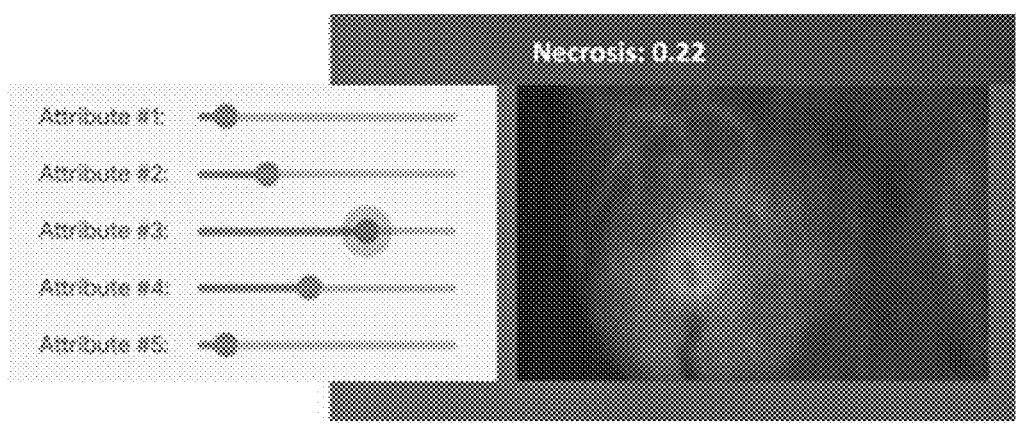
FIG. 17B illustrates an exemplary interactive user interface, in accordance with some examples.

FIGS. 17A-B illustrate exemplary interactive user interfaces for controlling the effects of top-K attributes on the classification of the fluorescence image. Each figure illustrates the effect of manipulating a set of top-K attributes of the same fluorescence image on the classifier's probability prediction. FIG. 17A illustrates the effect of a first set of top-K attribute settings, with top-K attribute #1 being set to have a higher prominence than the other top-K attributes. In this example, increasing the prominence of attribute #1 causes the classifier's probability prediction to be 0.83. A score of 0 represents a 0% probability of necrosis, and a score of 1 represents a 100% probability of necrosis. FIG. 17B illustrates the effect of selectively manipulating the top-K attribute settings such that top-K attribute #3 has the highest prominence of the top-K attributes. In this example, increasing the prominence of attribute #3 causes the classifier's probability prediction to drop to 0.22.

Turning back to FIG. 7, at block 706, the system tests the GAN model using a plurality of testing images. The plurality of testing images comprises both images associated with an abnormal future outcome and images associated with a normal future outcome. Images associated with an abnormal outcome can include intraoperative images and/or videos of one or more tissues of one or more patients, where the one or more tissues are known to have developed one or more post-operation complications (e.g., delayed healing, infection, mortality, development of cancer). Each testing image can be labeled as "normal" or "abnormal."

In some examples, an exemplary testing operation can be performed as follows. In Step 1, the system acquires the plurality of testing images. In Step 2, the system splits the images into validation and hold-out sets. In Step 3, the system generates pixel-wise and image-wise anomaly scores for a set of normal images from the validation set. In Step 4, the system generates pixel-wise and image-wise anomaly scores for a set of abnormal images from the validation set. In Step 5, the system empirically determines the anomaly thresholds (pixel-wise and image-wise thresholds) that would maximize precision and recall metrics for anomalous images in the validation set. In Step 6, the system repeats Steps 3 and 4 on the hold-out set instead of the validation set and use the anomaly thresholds values from Step 5 to classify the images and their pixels. In Step 7, the system compares predictions from Step 6 with the ground truth labels to assess the overall performance of the system. In some examples, to better evaluate the pixel-level performance, the system can present the images containing pixels marked as anomalous to domain experts (e.g., plastic surgeons) and record their subjective assessment of whether the artificially highlighted areas are accurate from the clinical point of view.

In FIG. 7, more images associated with a normal future outcome are collected than images associated with an abnormal future outcome, in some examples. For example, the system can collect over 3,000 perfusion videos associated with a normal outcome but only 10-100 perfusion videos associated with an abnormal outcome. The normal image data can be used as unlabeled training data. Some of the normal image data can be labeled and used as labeled testing data. The abnormal image data can be used as labeled testing data. These techniques are advantageous because labeling a large volume of training data can be impractical, error-prone, and expensive. These techniques further bypass the problem of a highly unbalanced dataset, as many medical operations and procedures have a fairly low rate of complications, thus causing the abnormal images to be relatively scarce.

Figure 18:
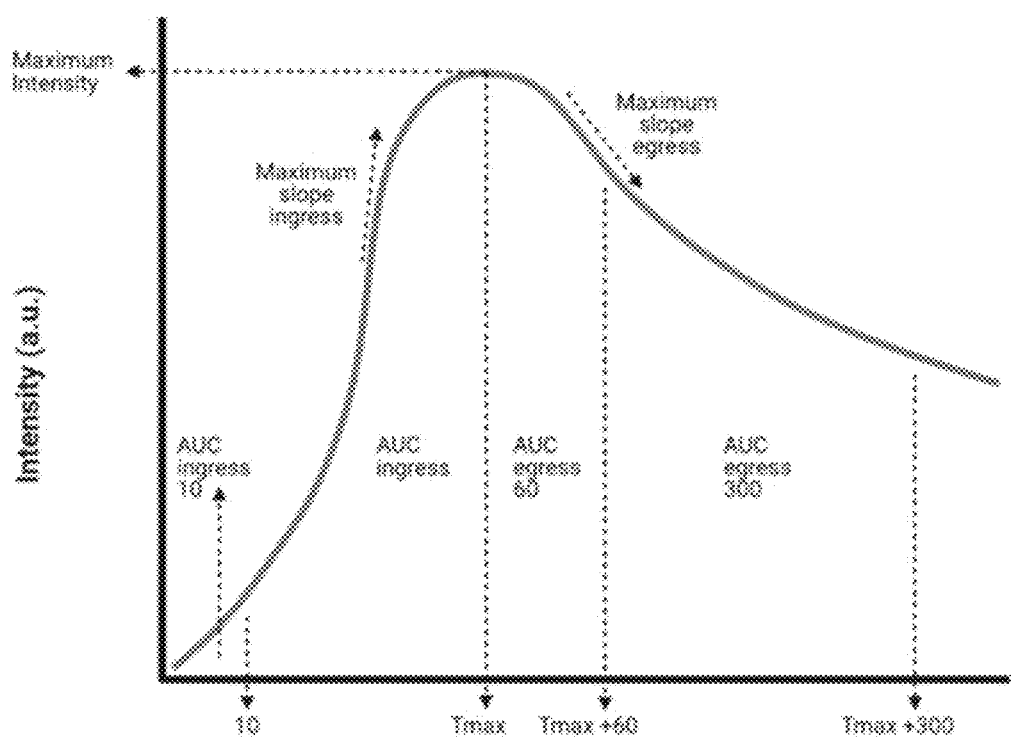
FIG. 18 illustrates a time-over-intensity angiographic curve, in accordance with some examples.

FIG. 18 illustrates a typical intensity-over-time angiographic curve. The curve is characterized by an ingress phase (indicated by Roman numeral I in the figure), which has a relatively fast initial increase in intensity; a subsequent plateau phase (II), during which the maximum intensity occurs; and a subsequent egress phase (III), which has a relatively slow downhill slope in intensity. The dynamics of these phases can affect post-operative outcomes. In some examples, a fluorescence image illustrating perfusion dynamics over time can be used to assess risk associated with an imaged tissue.

In some examples, the fluorescence image provided to the trained GAN model is a composite RGB image representing perfusion patterns over time. The RGB image can be a composite of three grayscale fluorescence images, wherein each grayscale image corresponds to a phase of an intensity-over-time angiographic curve believed to strongly affect a patient outcome (i.e., ingress phase, maximum intensity, and egress phase).

In some examples, a video can be recorded of fluorescence changes over time that covers the three phases of interest. Frames can be sampled for each phase and smoothed over time to reduce image noise. The selected frames can be tested for detrimental artifacts (e.g., blurring, poor focus) and corrected (e.g., by removing defective frames and repairing them or by choosing alternative frames). The corrected frames can be used to generate a representative grayscale image for each phase. The three resulting images can be combined to generate an RGB image, wherein each grayscale image corresponds to an RGB channel. The first grayscale image depicting the ingress phase can represent the red channel, the second grayscale image depicting the maximum intensity can represent the green channel, and the third grayscale image depicting the egress phase can represent the blue channel.

Figure 19A:
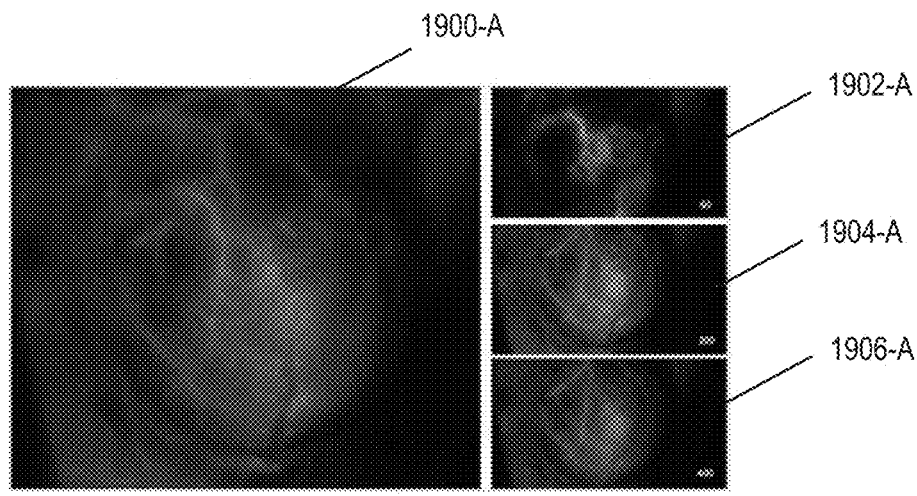
FIG. 19A illustrates an exemplary composite RGB image and corresponding grayscale images, in accordance with some examples.
Figure 19B:
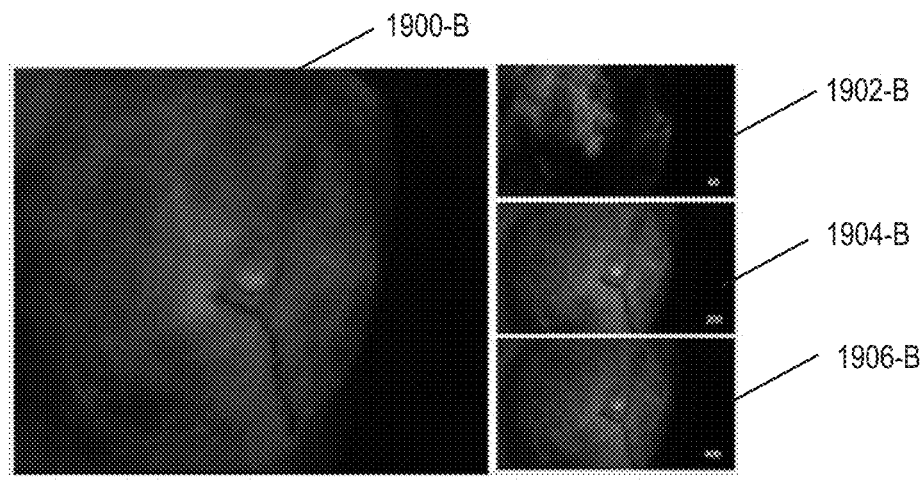
FIG. 19B illustrates an exemplary composite RGB image and corresponding grayscale images, in accordance with some examples.
Figure 19C:
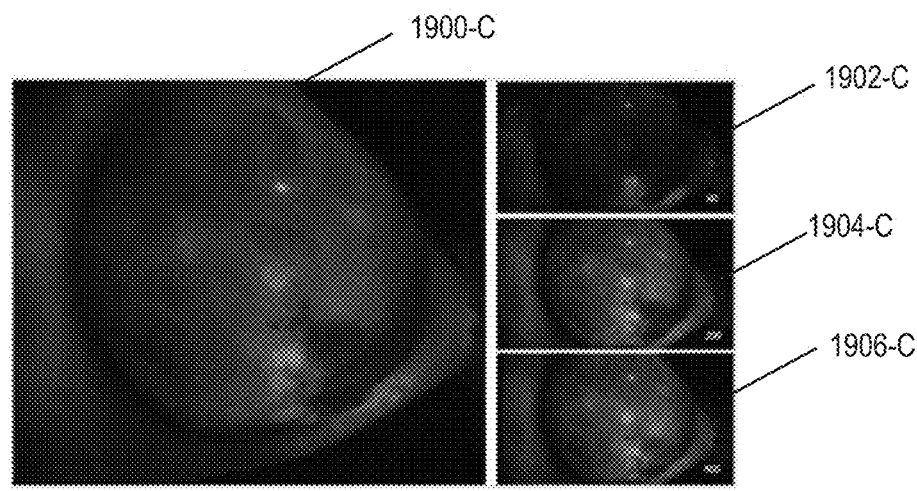
FIG. 19C illustrates an exemplary composite RGB image and corresponding grayscale images, in accordance with some examples.

FIGS. 19A-C illustrate exemplary composite RGB images 1900-A, 1900-B, and 1900-C. The RGB images 1900-A, 1900-B, and 1900-C(the color on the left side of each figure) illustrates a composite RGB image generated from the three grayscale fluorescence images on the right. Each top grayscale image 1902-A, 1902-B, and 1902-C illustrates the fluorescence pattern during the ingress phase of the respective angiographic curve and corresponds to the red channel of the corresponding RGB image 1900-A, 1900-B, and 1900-C. Each middle grayscale image 1904-A, 1904-B, and 1904-C illustrates the fluorescence pattern during the maximum intensity of the respective angiographic curve and corresponds to the green channel of the corresponding RGB image 1900-A, 1900-B, and 1900-C. Each bottom grayscale image 1906-A, 1906-B, and 1906-C illustrates the fluorescence pattern during the egress phase of the respective angiographic curve and corresponds to the blue channel of the corresponding RGB image 1900-A, 1900-B, and 1900-C.

Generating Predictive Simulated Medical Images

Also disclosed herein are exemplary devices, apparatuses, systems, methods, and non-transitory storage media for generating, based on fluorescence images of a tissue (e.g., captured during a surgery), simulated white-light image that represents a predicted future state of the tissue (e.g., 1-3 weeks after the surgery). In some examples, a GAN model can be trained using unpaired data. In other words, the training dataset does not need to contain a fluorescence image and a white-light image of the same subject. Eliminating the need for paired images is advantageous because paired images can be difficult or even impractical to obtain.

Figure 10:
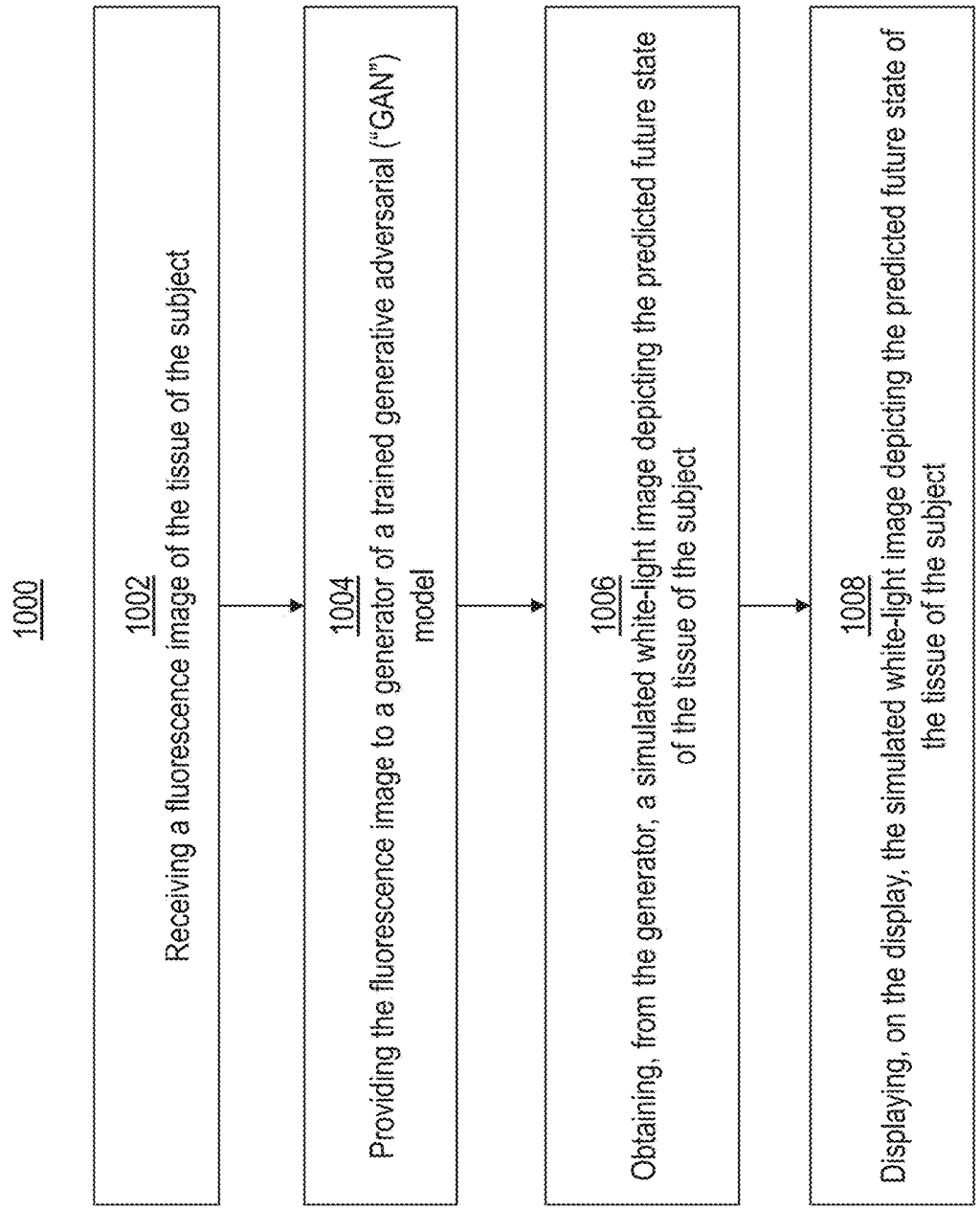
FIG. 10 illustrates an exemplary process for displaying a predicted future state of a tissue (e.g., breast tissue) of a subject, according to some examples.

In some examples, the GAN model can be trained using two datasets of images: image data of a first modality and image data of a second, different modality. In some examples, the image data of the first modality includes the perfusion videos and the image data of the second modality includes white-light outcome photos. In some examples, the image data of the second modality includes a set of anatomical illustrations depicting various possible outcomes such that the trained generator would produce an artificial illustration of the likely outcome. The images in the two datasets can come from different patients and may not have one-to-one correlations. By using unpaired images to train the GAN model, the techniques can lead to better usage and management of computer memory and more efficient usage of compute processing power, thus improving functioning of a computer system. Further, the GAN model can result in more accurate diagnosis and/or treatment of diseases, as discussed herein. FIG. 10 illustrates an exemplary process 1000 for displaying a predicted future state of a tissue (e.g., breast tissue) of a subject, according to some examples. Process 1000 is performed, for example, using one or more electronic devices implementing a software platform. In some examples, process 1000 is performed using a client-server system, and the blocks of process 1000 are divided up in any manner between the server and one or more client devices. In some examples, process 1000 is performed using only a client device or only multiple client devices. In process 1000, some blocks are, optionally, combined, the order of some blocks is, optionally, changed, and some blocks are, optionally, omitted. In some examples, additional steps may be performed in combination with the process 1000. Accordingly, the operations as illustrated (and described in greater detail below) are exemplary by nature and, as such, should not be viewed as limiting.

At block 1002, an exemplary system (e.g., one or more electronic devices) receives a fluorescence image of the tissue of the subject. In some examples, the fluorescence image is a NIR image of the tissue of the subject. For example, the fluorescence image can be an intraoperative perfusion image of the tissue of the subject (e.g., from an intraoperative perfusion video of the tissue of the subject). The video can indicate a spatial-temporal distribution of the fluorescent agent's intensity in a patient's blood stream. In some examples, the tissue of the subject comprises: breast tissue, burnt tissue, chronic wound tissue, acute wound tissue, or skin transplants.

At block 1004, the system provides the fluorescence image to a generator of a trained generative adversarial ("GAN") model.

In some examples, the GAN model is trained using a plurality of image pairs. Each image pair of the plurality of image pairs comprises a fluorescence image of a particular tissue during an operation and a white-light image of the same tissue after the operation. During training, the GAN model is configured to translate a fluorescence image in an image pair to a generated image. A reconstruction loss can be calculated to represent the difference between the generated image and the white-light image in the image pair. The GAN is updated based on the reconstruction loss and an adversarial loss. In some examples, the GAN model is a pix2pix GAN model.

In some examples, the GAN is trained using unpaired image data. This is because it may be impractical to collect aligned pairs of fluorescence images and their corresponding outcome photos. The unpaired image data can comprise a set of intraoperative fluorescence images (e.g., fluorescence perfusion maps) and a set of post-operation white-light images. The images in the two sets can come from different patients. In some examples, the GAN is a CycleGAN model.

It should be appreciated that other GAN models that can perform image-to-image translation based on unpaired training data.

Figure 11:
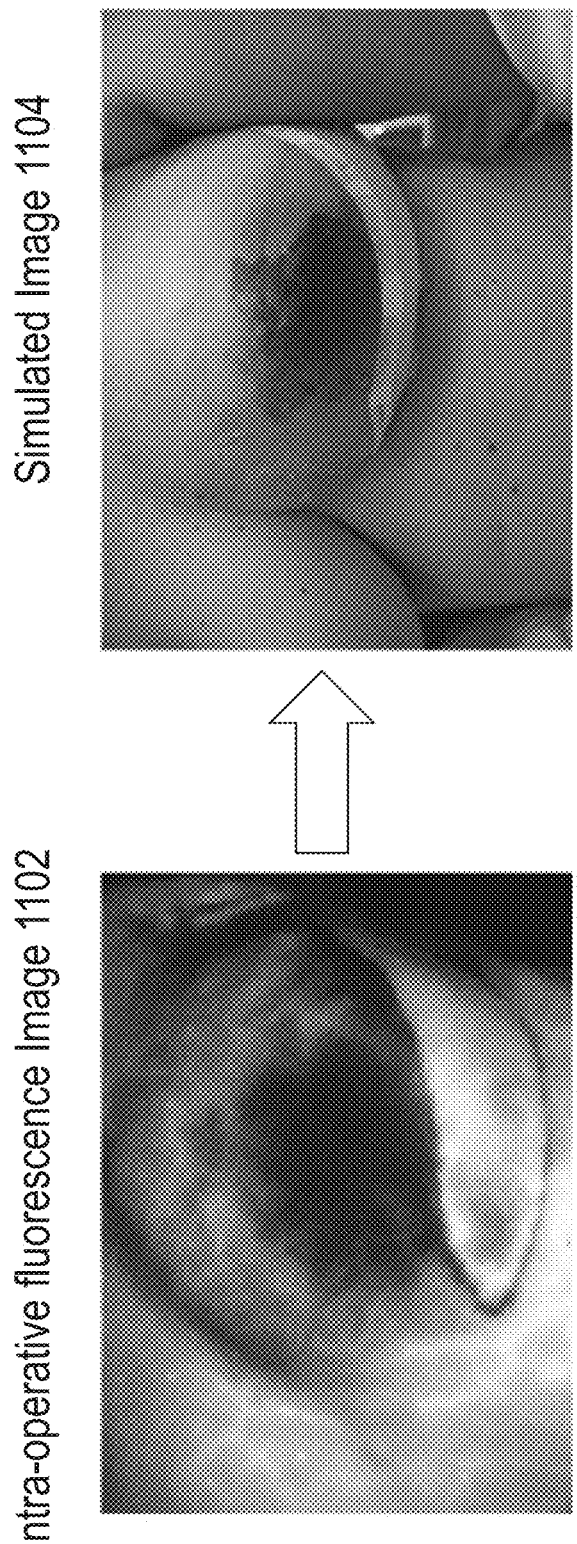
FIG. 11 illustrates a side-by-side comparison between an exemplary input image and an exemplary output image, according to some examples.

At block 1006, the system obtains, from the generator, a simulated white-light image depicting the predicted future state of the tissue of the subject. In some examples, the future state of the tissue may include necrosis, delayed healing, healing, or any combination thereof. In general, the techniques described herein can be useful for modalities for which predicting post-surgical tissue appearance provides valuable information during surgery (e.g., chronic wound treatment). FIG. 11 illustrates a side-by-side comparison between an exemplary input image (i.e., intra-operative fluorescence image 1102) and an exemplary output image (i.e., simulated image 1104). The image 1104 shows a predicted future outcome for the patient undergoing the surgery (e.g., 1-3 weeks after the surgery).

At block 1008, the system displays, on the display, the simulated white-light image depicting the predicted future state of the tissue of the subject. In some examples, the system further provides a recommendation based on the predicted future state of the tissue of the subject and/or administering a treatment based on the predicted future state of the tissue of the subject.

In some examples, the simulated white-light image (e.g., 1104) can be provided (e.g., displayed) to a medical practitioner, who can review the image to identify, recommend, and/or administer a treatment to the patient. In some examples, the simulated white-light image can be provided to a computer-based system, which processes the image to identify, recommend, and/or administer a treatment to the patient. For example, the system can provide the simulated white-light image to a classification model to automatically identify one or more complications (e.g., necrosis, delayed healing). Based on the identified issue, a treatment can be automatically recommended (e.g., via one or more graphical user interfaces). The treatment can also be automatically administered, for example, by a medical device (e.g., a surgical robot) based on the automatically recommended treatment.

Self-Supervised Learning Based on Perfusion Videos

Also described herein are exemplary devices, apparatuses, systems, methods, and non-transitory storage media for using a combination of self-supervised learning and supervised learning techniques to process medical images including fluorescence images. In some examples, a self-supervised encoder is trained using unlabeled images. For example, the unlabeled training images can include image frames from intraoperative videos (e.g., videos of surgical procedures). Different image frames can be sampled from different time points in a video, and they are not labelled with any additional information such as patient's metadata and outcomes. The encoder is trained to receive an input image and transform the input image into a latent representation, which amplifies the general features of the image while minimizing image-specific characteristics. After the encoder is trained, a model that is configured to receive the latent representation to perform a downstream task (e.g., a classification task) can be fine-tuned using training images that are labelled in accordance with the downstream task. The labeled training dataset can include fewer images than the unlabeled training dataset, thus reducing the need to label a large number of medical images.

Collecting, labeling, and storing a large volume of training images can lead to inefficient usage of computer memory and processing power. By training the encoder using unlabeled training data, the techniques can lead to better usage and management of computer memory and more efficient usage of compute processing power, thus improving functioning of a computer system. Further, the GAN model can result in more accurate diagnosis and/or treatment of diseases, as discussed herein.

Figure 12:
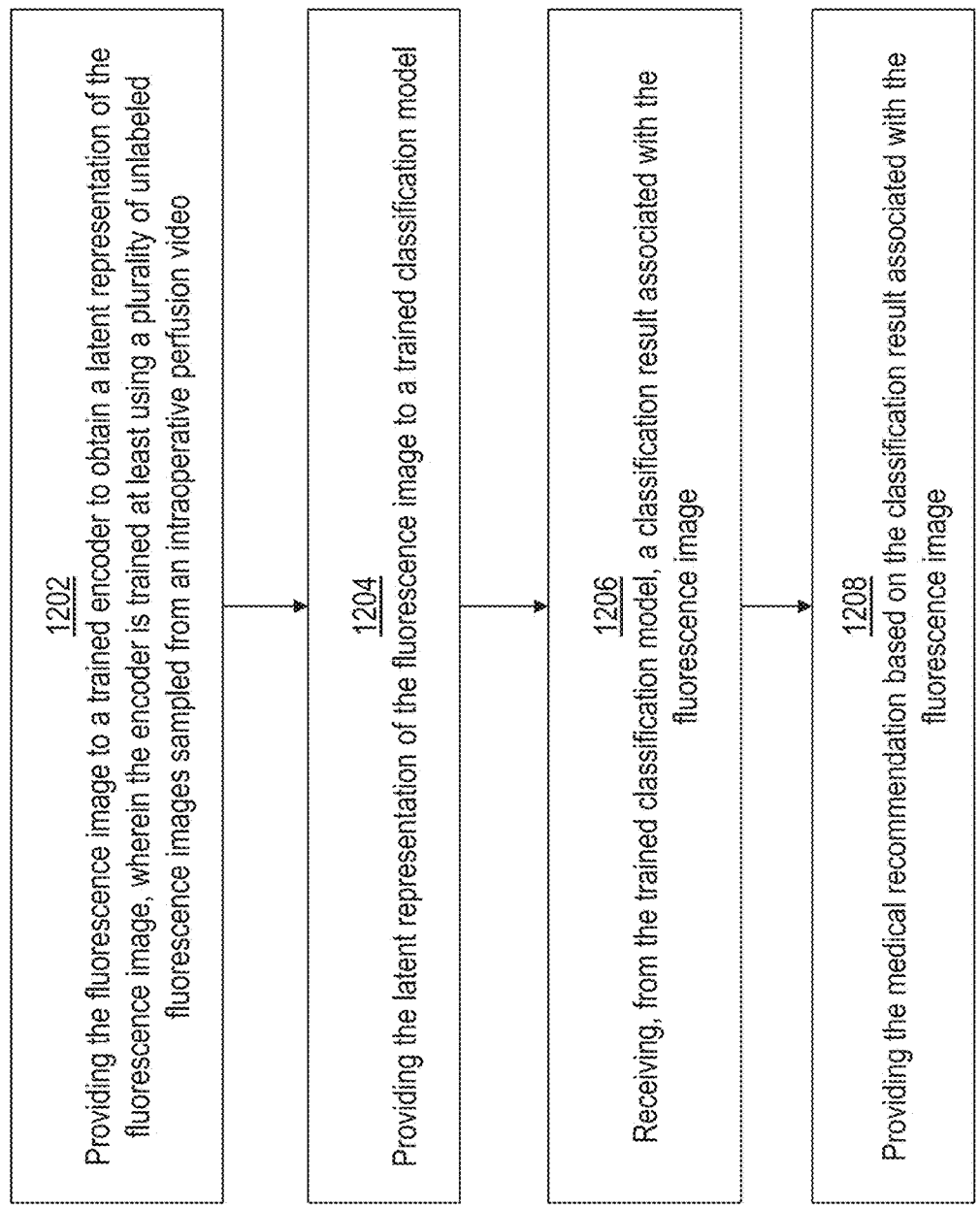
FIG. 12 illustrates an exemplary process for providing a medical recommendation based on a fluorescence image of a tissue of a subject, according to some examples.

FIG. 12 illustrates an exemplary process 1200 for providing a medical recommendation based on a fluorescence image of a tissue of a subject, according to some examples. Process 1200 is performed, for example, using one or more electronic devices implementing a software platform. In some examples, process 1200 is performed using a client-server system, and the blocks of process 1200 are divided up in any manner between the server and one or more client devices. In some examples, process 1200 is performed using only a client device or only multiple client devices. In process 1200, some blocks are, optionally, combined, the order of some blocks is, optionally, changed, and some blocks are, optionally, omitted. In some examples, additional steps may be performed in combination with the process 1200. Accordingly, the operations as illustrated (and described in greater detail below) are exemplary by nature and, as such, should not be viewed as limiting.

At block 1202, an exemplary system provides the fluorescence image to a trained encoder to obtain a latent representation of the fluorescence image. In some examples, the fluorescence image is a NIR image of the tissue of the subject. In some examples, the fluorescence image is an intraoperative perfusion image of the tissue of the subject. In some examples, the fluorescence image is from an intraoperative perfusion video of the tissue of the subject taken during a surgical procedure.

The encoder is configured to receive an input image and output a latent representation (e.g., a vector in a latent space) of the input image. The latent representation preserves the invariant features of the input image, while minimizing image-specific characteristics (e.g., imaging angle, resolution, artifacts). The encoder is trained at least using a plurality of unlabeled fluorescence images sampled from an intraoperative perfusion video. Exemplary training of the encoder is described below with reference to FIGS. 13 and 14.

The latent representation obtained in block 1202 can be used as an input to a variety of downstream tasks. At block 1204, the system provides the latent representation of the fluorescence image to a trained model. In some examples, the model is a trained classification model. However, it should be appreciated that the latent representation can be inputted into any type of downstream model or algorithm to obtain more information from the input fluorescence image. For example, the system can use the latent representation to perform anatomy/instrument segmentation, to recognize actions in surgical videos, to perform next frame prediction in a video stream when regions of interest are temporarily out of view (for example, during peristaltic movements of the dye through tissue) to ensure persistence of visualization. For example, given a sequence of frames where fluorescence signal is present, the system can predict the location of the signal in the next frame. This can be helpful, for example, during a ureter visualization procedure, where the dye moves through the tissue by peristaltic flow of urine and causes periodic loss of fluorescence during the rest phase.

At block 1206, the system receives, from the trained model, an output associated with the fluorescence image. The output can indicate more information about the input fluorescence image. For example, the output can indicate a diagnosis of a medical condition. As another example, the output can indicate a detection of a malignant tissue. As another example, the output can indicate a predicted future outcome. As another example, the output can indicate an identification of an action depicted in the image. If the model is a classification model, the classification model is configured to receive the latent representation to provide a classification result. Exemplary training of the model is described below with reference to FIGS. 13 and 14.

At block 1208, the system provides the medical recommendation based on the output associated with the fluorescence image. In some examples, the recommendation is for administering a treatment. Based on the identified issue, a treatment can be automatically recommended (e.g., via one or more graphical user interfaces). The treatment can also be automatically administered, for example, by a medical device (e.g., a surgical robot) based on the automatically recommended treatment.

Figure 16:
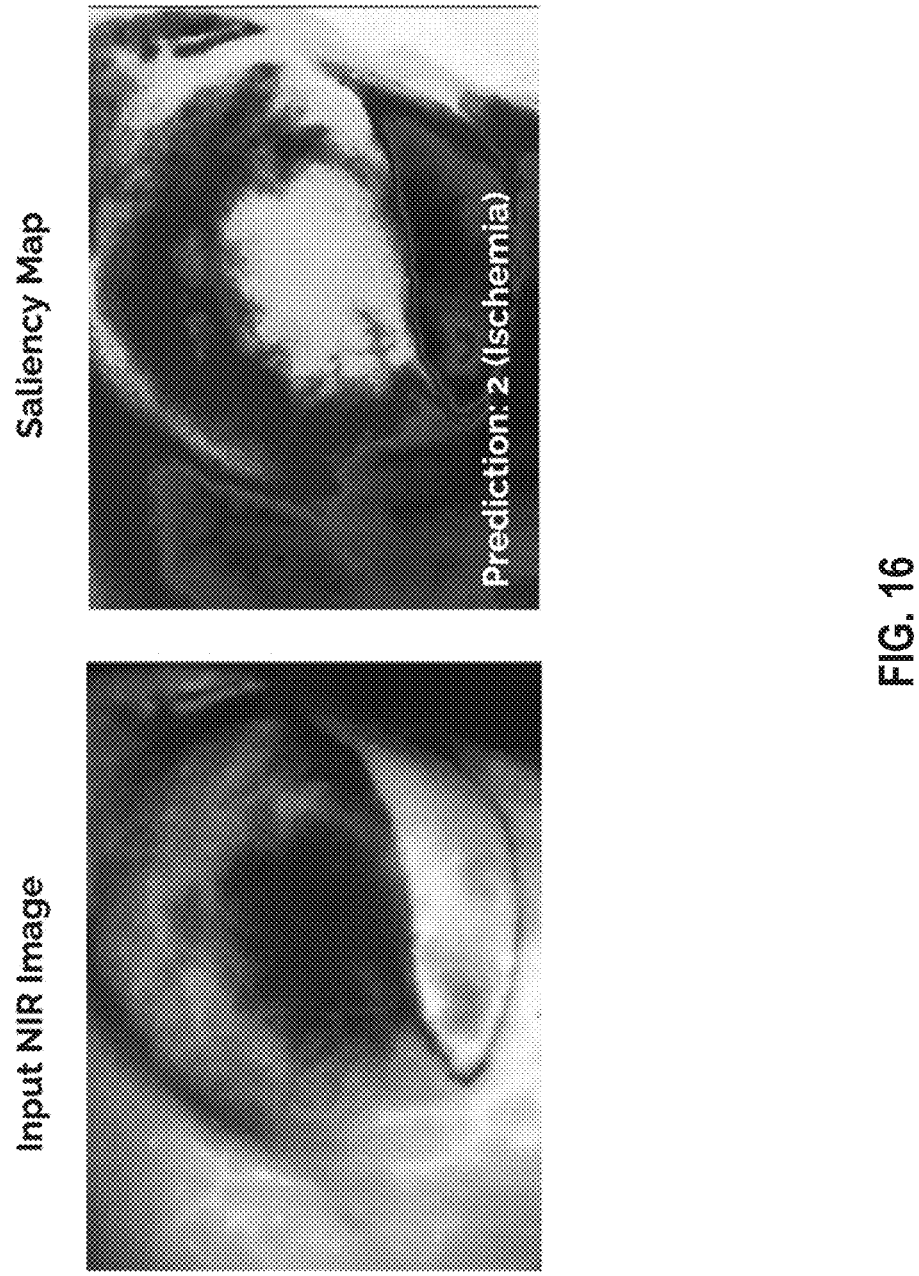
FIG. 16 illustrates an exemplary input fluorescence image and a corresponding saliency map, in accordance with some examples.

In some examples, the system can identify one or more regions of interest in the fluorescence image and display the fluorescence image and an indication of the one or more regions of interest. In some examples, the system can identify a set of domain features such as pixels of an image that contributes to the output decision of the classification model. The system can then generate a saliency map that visualizes those features (e.g., using a color overlay or pixels of varying colors, intensities, grey levels, etc.). FIG. 16 illustrates an exemplary input fluorescence image and a corresponding saliency map visualizing the pixels that contributed to the classification result (i.e., ischemia).

Figure 13:
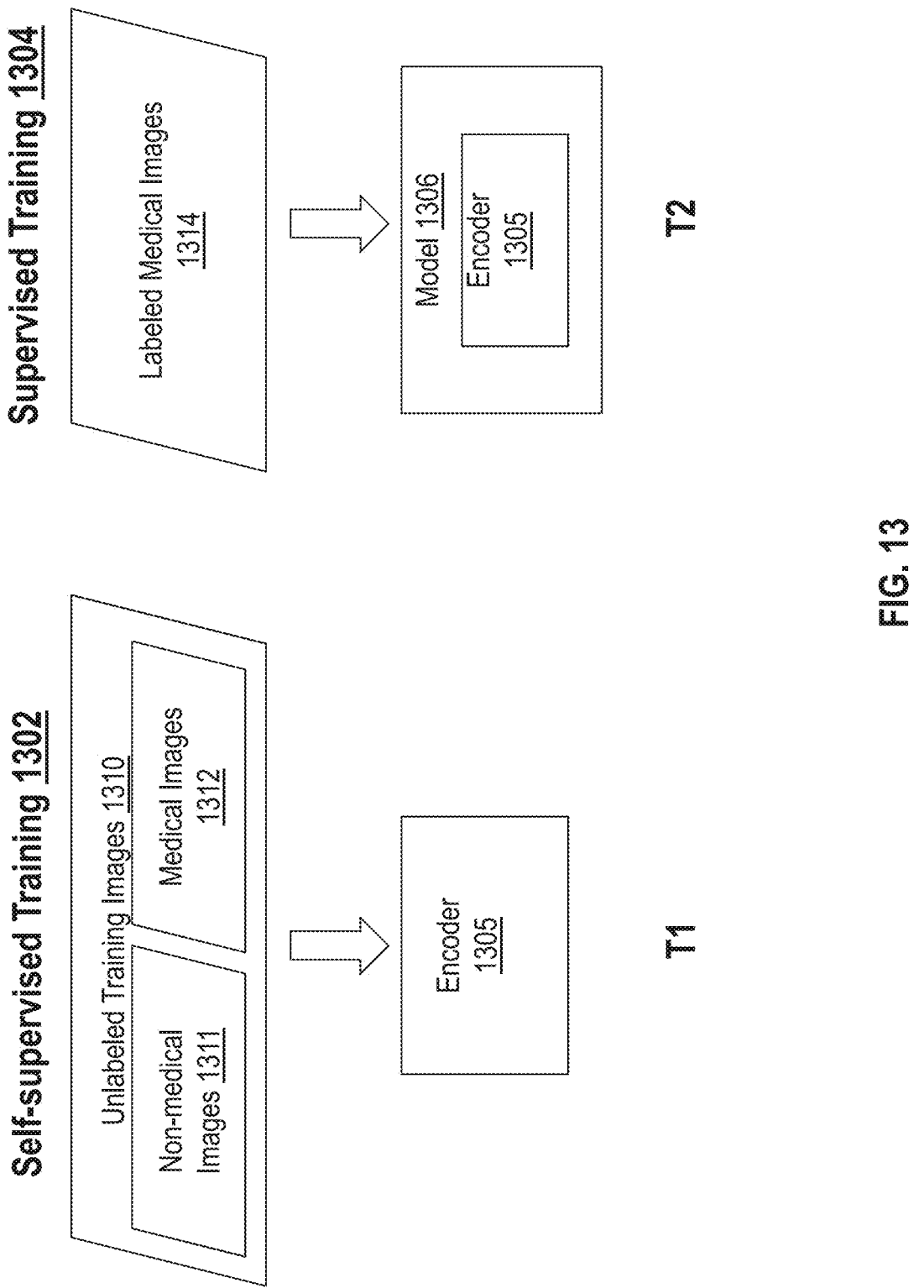
FIG. 13 illustrates training of the encoder and the classification model used in the process in FIG. 12, in accordance with some examples.

FIG. 13 illustrates training of the encoder and the model used in process 1200, in accordance with some examples. With reference to FIG. 13, at T1, self-supervised training 1302 is performed on the encoder model 1305 using a plurality of unlabeled training images 1310. In some examples, the plurality of training images comprises non-medical images 1311 and medical images 1312. The non-medical images can comprise one or more datasets of natural images. For example, images from a publicly available image dataset (e.g., ImageNet) can be used. In some examples, the encoder model 1305 is first trained using non-medical images 1311 before trained using medical images 1312.

The encoder model 1305 can be a contrastive learning algorithm. Contrastive learning can refer to a machine learning technique used to learn the general features of a dataset without labels by teaching the model which data points are similar or different. Exemplary contrastive learning models include SimCLR and SwAV, but it should be appreciated that any contrastive learning algorithm can be used as the encoder model 1305.

Figure 14:
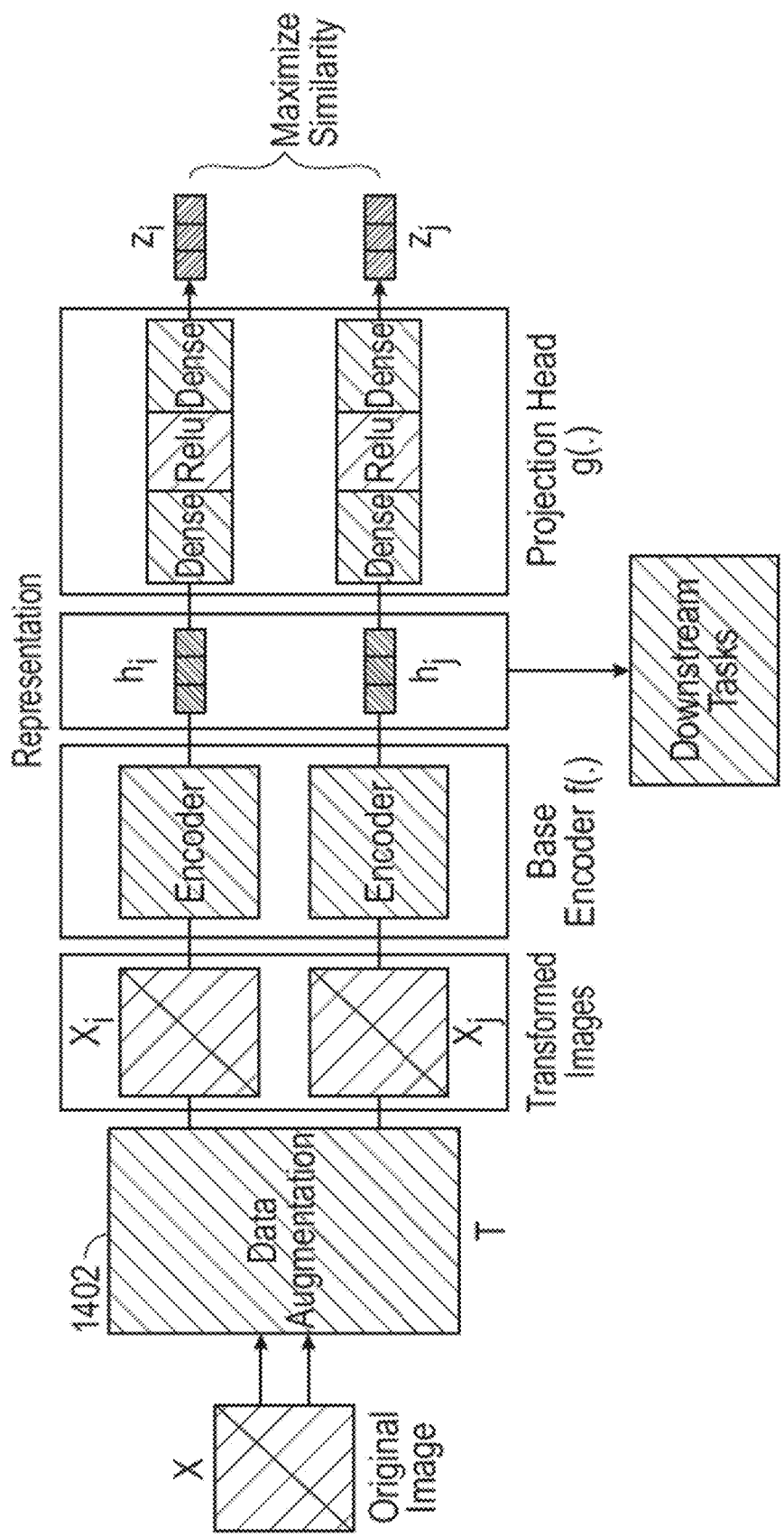
FIG. 14 illustrates training of an exemplary contrastive learning algorithm, in accordance with some examples.

FIG. 14 illustrates training of an exemplary contrastive learning algorithm using non-medical images (e.g., images 1311 in FIG. 13), in accordance with some examples. During training, an original image X is obtained (e.g., one of the non-medical images 1311 in FIG. 13). Data transformation or augmentation 1402 can be applied to the original image X to obtain two augmented images $X_i$ and $X_j$. For example, the system can randomly apply two separate data augmentation operators (e.g., crop, flip, color jitter, grayscale, blur) to obtain $X_i$ and $X_j$.

Each of the two augmented images $X_i$ and $X_j$ is passed through an encoder to obtain respective vector representations in a latent space. In the depicted example, the two encoders have shared weights. In some examples, each encoder is implemented as a neural network. For example, an encoder can be implemented using a variant of the residual neural network ("ResNet") architecture. As shown, the two encoders output $h_i$ (vector outputted by the encoder from $X_i$) and $h_j$ (vector outputted by the encoder from $X_j$).

The two vector representations $h_i$ and $h_j$ are passed through a projection head to obtain two projections $z_i$ and $z_j$. In some examples, the projection head comprises a series of non-linear layers (e.g., Dense→Relu→Dense layers) to apply non-linear transformation on the vector representation to obtain the projection. The projection head amplifies the invariant features and maximizes the ability of the network to identify different transformations of the same image.

During training, the similarity between the two projections $z_i$ and $z_j$ for the same image is maximized. For example, a loss is calculated based on $z_i$ and $z_j$, and the encoder is updated based on the loss to maximize a similarity between the two latent representations. In some examples, to maximize agreement (i.e., similarity) between the z-projections, the system can define the similarity metric as cosine similarity:

$$sim(u, v) = \frac{u^T v}{\|u\|\|v\|}$$

In some examples, the system trains the network by minimizing the normalized temperature-scaled cross-entropy loss:

$$\ell_{i,j} = -\log \frac{\exp(sim(z_i, z_j)/\tau)}{\sum_{k=1}^{2N} 1_{[k \neq i]} \exp(sim(z_i, z_k)/\tau)}$$

where $\tau$ denotes an adjustable temperature parameter. Accordingly, via training, the encoder learns to output a vector representation that preserves the invariant features of the input image while minimizing image-specific characteristics (e.g., imaging angle, resolution, artifacts).

Returning to FIG. 13, after the encoder model 1305 is trained using non-medical images 1311, the encoder model 1305 can be further trained using medical images 1312. In some examples, the medical images 1312 include a plurality of unlabeled fluorescence images sampled from an intraoperative perfusion video (e.g., a video recording of a surgical procedure).

Figure 15:
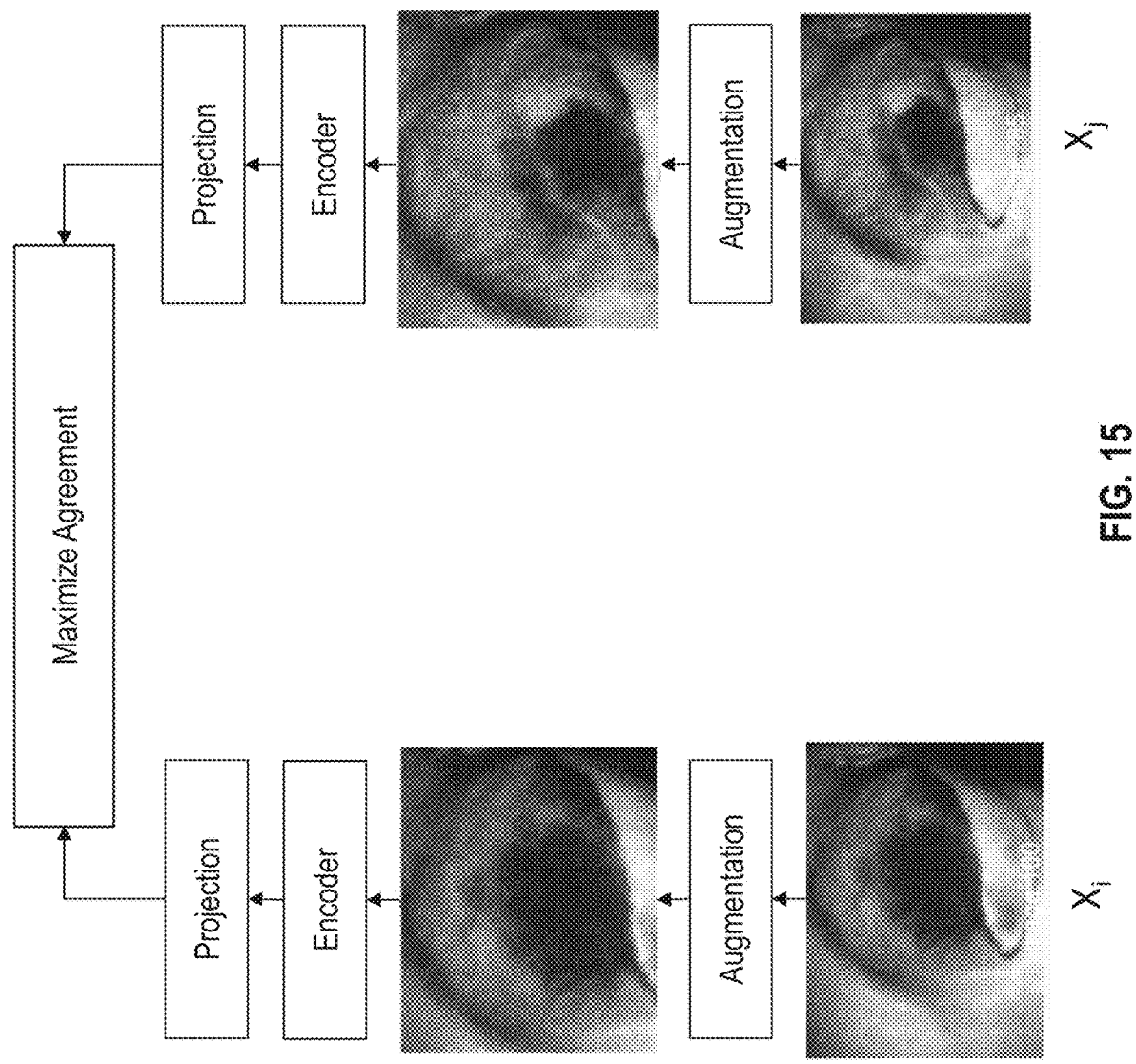
FIG. 15 illustrates training of an exemplary contrastive learning algorithm, in accordance with some examples.

Training of the encoder 1305 using medical images 1312 can be performed in a similar manner as the approach described with reference to FIG. 14. In some examples, rather than obtaining $X_i$ and $X_j$ by applying data augmentation 1402 to a single image, the system samples two images from a medical video at two time points as $X_i$ and $X_j$. In some examples, the system identifies, in an intraoperative perfusion video, an anchor image. In some examples, the anchor image is an image having a relatively large amount of information (e.g., the image having the highest frame intensity standard deviation). The system then identifies two other images in the video based on the anchor image. For example, the system can identify an image captured before the image having the highest frame intensity standard deviation (e.g., by a specific time duration) and an image captured after the image having the highest frame intensity standard deviation (e.g., by the same specific time duration). In another example, the system can identify a first image before an event (e.g., injection) in the intraoperative perfusion video; and identify a second image after the event in the intraoperative perfusion video. The two identified fluorescence images can be used as $X_i$ and $X_j$ to train the encoder as described above. In some examples, random augmentation (e.g., similar to augmentation 1402) can be performed on $X_i$ and $X_j$ before they are inputted into the encoders, as depicted in FIG. 15.

Returning to FIG. 13, after the encoder is trained at T1, the system trains a classification model 1306 (e.g., the model used in block 1204 in FIG. 12) using a plurality of labeled images 1314.

In some examples, the plurality of labeled images comprises one or more images from one or more intraoperative perfusion videos. In some examples, each patient's video can be represented by one or more fluorescence frames sampled at pre-defined timeslots. For example, the system can identify, in the intraoperative perfusion video, an anchor image having the highest frame intensity standard deviation. The system can then sample images based on the anchor image. For example, the system can sample an image captured before the image having the highest frame intensity standard deviation (e.g., by a specific time duration) and an image captured after the image having the highest frame intensity standard deviation (e.g., by the same specific time duration) and include them in the training images 1314.

Each training image of training images 1314 comprises a label. The number and types of labels can vary based on the classification task the model is trained to perform. For example, if the model is trained to predict a future outcome, each image can be assigned a label based on the patent's outcome recorded during a follow-up visit (e.g., a week after the surgery). For example, the image can have a label of 0 to indicate no complications, a label of 1 to indicate inflammation, and a label of 3 to indicate ischemia.

The labeled medical images 1314 are used to train the model 1306. The model can be a classification model that is configured to receive a latent representation of an image (produced by the encoder 1305) and provide a classification result. During training, each training image is transformed into a latent representation using encoder 1305 and provided to the model 1306 to obtain a classification result. A loss is calculated based on the classification result and the label of the training image. The model 1306 is updated based on the loss. In some examples, the classifier is updated based on the loss. In some examples, both the classifier and the encoder are updated based on the loss. For example, the system can be configured to train only the classification head and keep the features extracted during self-supervised pre-training frozen. As another example, the system can fine-tune the entire network (both the encoder and the classification head), or just select layers of the encoder. Which component(s) to update can be based on which training strategy results in the best performance on the downstream task (e.g., classification).

In some examples, some or all of the labeled medical images 1314 are from the unlabeled medical images 1312, with labels added in accordance with the downstream task. The labeled training dataset can include fewer images than the unlabeled training dataset, thus reducing the need to label a large number of medical images to train the model.

In some examples, the encoder 1305 and/or the model 1306 are domain-specific. For example, the encoder can be trained using medical images of a specific domain and used to process input images of the same domain. The techniques described herein can be applied to any modality where blood perfusion dynamics is correlated with the outcome/diagnostic and where the case distribution is skewed towards normal observations (e.g., there are more images depicting normal samples than abnormal samples). For example, the system can train the encoder on fluorescence images acquired from healthy patients (or from healthy tissues of sick patients) and then use the model for identification of malignancies (e.g., cancerous vs. benign lesions). The foregoing description, for the purpose of explanation, has been described with reference to specific examples or embodiments. However, the illustrative discussions above are not intended to be exhaustive or to limit the invention to the precise forms disclosed. For the purpose of clarity and a concise description, features are described herein as part of the same or separate examples; however, it will be appreciated that the scope of the disclosure includes examples having combinations of all or some of the features described. Many modifications and variations are possible in view of the above teachings. The examples were chosen and described in order to best explain the principles of the techniques and their practical applications. Others skilled in the art are thereby enabled to best utilize the techniques and various examples with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

What is claimed is:

1. A method of displaying risk assessment of a tissue of a subject, comprising:
   receiving a fluorescence image of the tissue of the subject;
   providing the fluorescence image to a trained generative adversarial ("GAN") model, wherein the GAN model is trained using a plurality of unlabeled training images associated with a normal future outcome, wherein the GAN model is tested using a plurality of testing images associated with an adverse future outcome, wherein the plurality of testing images comprises a plurality of intraoperative images of one or more tissues of one or more patients, and wherein the one or more tissues are known to have developed one or more post-operation complications comprising necrosis, anastomotic leak, delayed healing, mortality, or any combination thereof;
   obtaining, based on the GAN model, one or more pixel-wise anomaly scores associated with one or more pixels of the fluorescence image, wherein the one or more pixel-wise anomaly scores are indicative of abnormality of the tissue of the subject; and
   displaying, based on the one or more pixel-wise anomaly scores, the risk assessment of the tissue in the fluorescence image.

2. The method of claim 1, wherein the risk assessment comprises a color overlay on the fluorescence image.

3. The method of claim 1, further comprising:
   comparing each of the one or more pixel-wise anomaly scores with a pixel-wise threshold; and
   determining pixel-wise color intensities of the color overlay based on the comparison.

4. The method of claim 1, further comprising: calculating an image-wise anomaly score based on the one or more pixel-wise anomaly scores.

5. The method of claim 1, further comprising: predicting a future medical outcome of the tissue of the subject based on the image-wise anomaly score by comparing the image-wise anomaly score with a predefined image-wise threshold.

6. The method of claim 1, further comprising: providing a recommendation based on the predicted future outcome of the tissue of the subject.

7. The method of claim 6, wherein the recommendation is for administering a treatment based on the predicted future outcome of the tissue of the subject.

8. The method of claim 1, wherein the fluorescence image is a NIR image of the tissue of the subject.

9. The method of claim 1, wherein the fluorescence image is an intraoperative perfusion image of the tissue of the subject.

10. The method of claim 1, wherein the fluorescence image is from an intraoperative perfusion video of the tissue of the subject.

11. The method of claim 1, wherein the plurality of unlabeled training images comprises a plurality of intraoperative images of one or more tissues of one or more patients, wherein the one or more tissues are known to have had a timely post-operation recovery.

12. The method of claim 1, wherein the GAN model comprises: a trained generator, a trained discriminator, and a trained encoder.

13. The method of claim 12, wherein the generator is configured to receive a latent vector and generate an output image.

14. The method of claim 12, wherein the discriminator is configured to measure a distance between two images.

15. The method of claim 12, wherein the encoder is configured to receive an input image and output a latent vector.

16. The method of claim 12, wherein the GAN model is trained by:
training the generator and the discriminator; and
training the encoder using the trained generator and the trained discriminator.

17. The method of claim 16, wherein training the encoder comprises:
providing a training image of the plurality of unlabeled training images to the encoder to obtain a latent vector;
providing the latent vector to the trained generator to obtain a generated image;
calculating a first loss based on a difference between the generated image and the training image;
providing the generated image and the real image to the trained discriminator to obtain a second loss; and
updating the encoder based on the first loss and the second loss.

18. The method of claim 12, wherein providing the fluorescence image to the trained GAN model comprises:
providing the fluorescence image to the trained encoder to obtain a latent vector;
providing the latent vector to the trained generator to obtain a generated image;
calculating a first difference between the fluorescence image and the generated image;
providing the generated image and the fluorescence image to the trained discriminator to obtain a second difference; and
calculating the anomaly score based on the first difference and the second difference.

19. The method of claim 1, wherein the GAN model is an f-AnoGAN model.

20. The method of claim 1, wherein the GAN model comprises: a trained generator, a trained discriminator, and a trained encoder identical to a portion of the trained generator.

21. The method of claim 20, wherein the generator is configured to receive an input image, translate the input image into a latent vector, and translate the latent vector into an output image.

22. The method of claim 20, wherein the discriminator is configured to measure a distance between two images.

23. The method of claim 20, wherein the GAN model is trained by:
providing a training image of the plurality of unlabeled training images to the generator to obtain a latent vector and a generated image;
calculating a first loss based on the training image and the generated image;
providing the generated image and the training image to the discriminator to obtain a second loss; and
updating the model based on the first loss and the second loss.

24. The method of claim 20, wherein providing the fluorescence image to the trained GAN model comprises:
providing the fluorescence image into the trained generator to obtain a first latent vector and a generated image;
providing the generated image to the trained encoder to obtain a second latent vector; and
calculating the anomaly score based on the first latent vector and the second latent vector.

25. The method of claim 20, wherein the GAN model is a Sparse-GAN model.

26. The method of claim 1, wherein the GAN model is tested using a plurality of testing images associated with an adverse future outcome and a plurality of testing images associated with a normal future outcome.

27. The method of claim 26, wherein testing the GAN model comprises:
inputting the plurality of testing image to the trained GAN model to obtain a plurality of anomaly scores; and
calculating a predefined image-wise threshold based on the plurality of anomaly scores.

28. The method of claim 26, wherein testing the GAN model comprises:
inputting the plurality of testing image to the trained GAN model to obtain a plurality of pixel-wise anomaly scores; and
calculating a predefined pixel-wise threshold based on the plurality of pixel-wise anomaly scores.

29. The method of claim 1, wherein the GAN model is a StyleGAN model.

30. The method of claim 29, further comprising:
obtaining, based on the GAN model, a classification of the tissue in the fluorescence image, wherein the classification includes an indication of a probability of necrosis;
searching a StyleSpace of a generator of the GAN model for a set of one or more top-K attributes that affect classification of the fluorescence image; and
displaying the set of one or more top-K attributes on an interactive user interface.

31. The method of claim 30, wherein the interactive user interface comprises a control panel configured to manipulate the set of one or more top-K attributes and visualize an effect of each top-K attribute on the classification of the fluorescence image.

32. The method of claim 1, wherein the fluorescence image is a composite RGB image, wherein the composite RGB image comprises a first grayscale image taken during an ingress phase of an angiographic curve representing a red channel, a second grayscale image taken at a maximum intensity of the curve representing a green channel, and a third grayscale image taken during an egress phase of the curve representing a blue channel.

33. A system for displaying risk assessment of a tissue of a subject, comprising:
   one or more processors;
   one or more memories; and
   one or more programs, wherein the one or more programs are stored in the one or more memories and configured to be executed by the one or more processors, the one or more programs including instructions for:
      receiving a fluorescence image of the tissue of the subject;
      providing the fluorescence image to a trained generative adversarial ("GAN") model, wherein the GAN model is trained using a plurality of unlabeled training images associated with a normal future outcome, wherein the GAN model is tested using a plurality of testing images associated with an adverse future outcome, wherein the plurality of testing images comprises a plurality of intraoperative images of one or more tissues of one or more patients, and wherein the one or more tissues are known to have developed one or more post-operation complications comprising necrosis, anastomotic leak, delayed healing, mortality, or any combination thereof;
      obtaining, based on the GAN model, one or more pixel-wise anomaly scores associated with one or more pixels of the fluorescence image, wherein the one or more pixel-wise anomaly scores are indicative of abnormality of the tissue of the subject; and
      displaying, based on the one or more pixel-wise anomaly scores, the risk assessment of the tissue in the fluorescence image.

34. A non-transitory computer-readable storage medium storing one or more programs, the one or more programs comprising instructions, which when executed by one or more processors of an electronic device, cause the electronic device to:
   receive a fluorescence image of the tissue of the subject;
   provide the fluorescence image to a trained generative adversarial ("GAN") model, wherein the GAN model is trained using a plurality of unlabeled training images associated with a normal future outcome, wherein the GAN model is tested using a plurality of testing images associated with an adverse future outcome, wherein the plurality of testing images comprises a plurality of intraoperative images of one or more tissues of one or more patients, and wherein the one or more tissues are known to have developed one or more post-operation complications comprising necrosis, anastomotic leak, delayed healing, mortality, or any combination thereof;
   obtain, based on the GAN model, one or more pixel-wise anomaly scores associated with one or more pixels of the fluorescence image, wherein the one or more pixel-wise anomaly scores are indicative of abnormality of the tissue of the subject; and
   display, based on the one or more pixel-wise anomaly scores, the risk assessment of the tissue in the fluorescence image.

* * * * *